(12) United States Patent
Mercep et al.

(10) Patent No.: US 10,884,409 B2
(45) Date of Patent: Jan. 5, 2021

(54) TRAINING OF MACHINE LEARNING SENSOR DATA CLASSIFICATION SYSTEM

(71) Applicant: Mentor Graphics Development (Deutschland) GmbH, Wilsonville, OR (US)

(72) Inventors: Ljubo Mercep, Munich (DE); Matthias Pollach, Munich (DE)

(73) Assignee: Mentor Graphics (Deutschland) GmbH, Munich (DE)

( * ) Notice: Subject to any disclaimer, the term of this patent is extended or adjusted under 35 U.S.C. 154(b) by 303 days.

(21) Appl. No.: 15/872,275

(22) Filed: Jan. 16, 2018

(65) Prior Publication Data
US 2018/0314921 A1    Nov. 1, 2018

Related U.S. Application Data

(60) Provisional application No. 62/492,416, filed on May 1, 2017.

(51) Int. Cl.
*G05D 1/00* (2006.01)
*G01S 17/931* (2020.01)
(Continued)

(52) U.S. Cl.
CPC ....... *G05D 1/0088* (2013.01); *B60R 16/0231* (2013.01); *G01S 7/4808* (2013.01);
(Continued)

(58) Field of Classification Search
CPC ............. G06K 9/00791; G06K 9/6267; G06K 9/6289; G06K 9/66; G06K 9/00201;
(Continued)

(56) References Cited

U.S. PATENT DOCUMENTS 5,363,305 A    11/1994   Cox et al.
5,883,586 A    3/1999    Tran
(Continued)

FOREIGN PATENT DOCUMENTS

| CN | 101 876 750 B | 11/2015 |
|---|---|---|
| EP | 2 107 503 A1 | 10/2009 |
| WO | 2009/070069 A1 | 6/2009 |

OTHER PUBLICATIONS

Barzilay and Szolovits, "Exact inference in bayes nets—pseudocode." Mass. Init. Technology (retrieved at http://courses.csail.mit.edu/6.034s/handouts/spring12/bayesnets-pseudocode.pdf on Jun. 4, 2018), Feb. 2012.
(Continued)

*Primary Examiner* — Marthe Y Marc-Coleman
(74) *Attorney, Agent, or Firm* — Mentor Graphics Corporation

(57) ABSTRACT

This application discloses training of a classification system for an assisted or automated driving system of a vehicle. A processing system can label sensor measurement data collected by sensors mounted in the vehicle with classifications, which can include a type of an object associated with the sensor measurement data and a confidence level of the classification. A training system can utilize the classifications labeled to the sensor measurement data to train a classification graph utilized by the classification system. The training system can select a node in a classification graph based, at least in part, on a classification labeled to sensor measurement data. The training system can compare the sensor measurement data to matchable data in the selected node, and modify the classification graph based, at least in part, on differences between the sensor measurement data and the matchable data in the selected node.

17 Claims, 14 Drawing Sheets

(51) Int. Cl.
| | |
|---|---|
| *G01S 17/86* | (2020.01) |
| *G01S 15/86* | (2020.01) |
| *G06T 7/73* | (2017.01) |
| *G06T 7/77* | (2017.01) |
| *G06T 7/277* | (2017.01) |
| *G06K 9/00* | (2006.01) |
| *G06T 7/246* | (2017.01) |
| *G06K 9/62* | (2006.01) |
| *G06K 9/46* | (2006.01) |
| *G01S 15/87* | (2006.01) |
| *G01S 13/72* | (2006.01) |
| *G01S 13/86* | (2006.01) |
| *G01S 7/41* | (2006.01) |
| *G01S 15/66* | (2006.01) |
| *G01S 17/66* | (2006.01) |
| *G01S 17/87* | (2020.01) |
| *G01S 13/87* | (2006.01) |
| *G06N 20/00* | (2019.01) |
| *G01S 15/931* | (2020.01) |
| *G01S 13/931* | (2020.01) |
| *G01S 7/539* | (2006.01) |
| *G01S 7/48* | (2006.01) |
| *B60R 16/023* | (2006.01) |
| *G06T 7/521* | (2017.01) |
| *G06T 7/55* | (2017.01) |
| *G06K 9/66* | (2006.01) |
| *G05D 1/02* | (2020.01) |

(52) U.S. Cl.
CPC ............ *G01S 7/539* (2013.01); *G01S 13/723* (2013.01); *G01S 13/862* (2013.01); *G01S 13/865* (2013.01); *G01S 13/867* (2013.01); *G01S 13/87* (2013.01); *G01S 13/931* (2013.01); *G01S 15/66* (2013.01); *G01S 15/86* (2020.01); *G01S 15/931* (2013.01); *G01S 17/86* (2020.01); *G01S 17/87* (2013.01); *G01S 17/931* (2020.01); *G06K 9/00201* (2013.01); *G06K 9/00791* (2013.01); *G06K 9/00805* (2013.01); *G06K 9/4604* (2013.01); *G06K 9/6267* (2013.01); *G06K 9/6282* (2013.01); *G06K 9/6289* (2013.01); *G06K 9/6296* (2013.01); *G06K 9/66* (2013.01); *G06N 20/00* (2019.01); *G06T 7/251* (2017.01); *G06T 7/277* (2017.01); *G06T 7/521* (2017.01); *G06T 7/55* (2017.01); *G06T 7/75* (2017.01); *G06T 7/77* (2017.01); *G01S 2013/9323* (2020.01); *G01S 2013/9324* (2020.01); *G01S 2013/93271* (2020.01); *G01S 2013/93272* (2020.01); *G01S 2013/93274* (2020.01); *G05D 1/024* (2013.01); *G05D 1/0246* (2013.01); *G05D 1/0255* (2013.01); *G05D 1/0257* (2013.01); *G05D 2201/0213* (2013.01); *G06K 9/00825* (2013.01); *G06K 2009/00738* (2013.01); *G06T 2207/10016* (2013.01); *G06T 2207/10028* (2013.01); *G06T 2207/10044* (2013.01); *G06T 2207/20072* (2013.01); *G06T 2207/20081* (2013.01); *G06T 2207/30252* (2013.01); *G06T 2207/30261* (2013.01)

(58) Field of Classification Search
CPC ............ G06K 9/00805; G06K 9/4604; G06K 9/6282; G06K 9/00825; G06K 2009/00738; G06K 2207/10016; G06K 2207/10028; G06K 2207/30252; G01S 13/931; G01S 17/936; G01S 7/539; G01S 7/4808; G01S 17/023; G01S 17/66; G01S 17/87; G01S 15/025; G01S 15/66; G01S 15/87; G01S 7/412; G01S 7/417; G01S 13/723; G01S 13/862; G01S 13/865; G01S 13/867; G01S 13/87; G01S 2013/9364; G01S 2013/9367; G01S 2013/9375; G01S 2013/9378; G01S 2013/9385; B60R 16/160231; G06N 20/00; G05D 1/0088; G05D 2201/0213; G05D 1/0255; G05D 1/0246; G05D 1/024; G05D 1/0257; G06T 7/55; G06T 7/521; G06T 7/75; G06T 7/77; G06T 7/251; G06T 7/277; G06T 2207/20072; G06T 2206/10044; G06T 2207/30261; G06T 2207/20081
USPC ........................................................ 701/23
See application file for complete search history.

(56) References Cited

U.S. PATENT DOCUMENTS

| | | | |
|---|---|---|---|
| 6,453,223 B1 | 9/2002 | Kelly | |
| 8,665,080 B2 | 3/2014 | Nagamine | |
| 8,805,648 B2 | 8/2014 | Painsky | |
| 8,912,978 B2 | 12/2014 | Szczerba | |
| 9,043,072 B1 | 5/2015 | Tisdale et al. | |
| 9,097,800 B1 | 8/2015 | Zhu | |
| 9,243,916 B2 | 1/2016 | Roumeliotis | |
| 9,285,805 B1 | 3/2016 | Pollock | |
| 9,292,791 B2 * | 3/2016 | Lu | G06N 5/02 |
| 9,336,436 B1 | 5/2016 | Dowdall | |
| 9,384,402 B1 | 7/2016 | Furman | |
| 9,690,293 B2 | 1/2017 | Shashua | |
| 9,582,080 B1 * | 2/2017 | Tilton | G06K 9/00536 |
| 9,612,123 B1 | 4/2017 | Levinson | |
| 9,623,905 B2 | 4/2017 | Shashua | |
| 9,665,100 B2 | 5/2017 | Shahuas | |
| 9,672,446 B1 | 6/2017 | Vallespi-Gonzalez | |
| 9,696,719 B2 | 7/2017 | Aviel | |
| 9,709,986 B2 | 7/2017 | Gdalyahi | |
| 9,719,801 B1 | 8/2017 | Ferguson et al. | |
| 9,760,090 B2 | 9/2017 | Shashua | |
| 2001/0040505 A1 | 11/2001 | Ishida | |
| 2004/0064241 A1 | 4/2004 | Sekiguchi | |
| 2005/0270286 A1 | 12/2005 | Hirvonen et al. | |
| 2007/0010933 A1 | 1/2007 | Hochkirchen | |
| 2007/0182623 A1 | 8/2007 | Zeng | |
| 2008/0033645 A1 | 2/2008 | Levinson et al. | |
| 2008/0243378 A1 | 2/2008 | Zavoli | |
| 2008/0189003 A1 | 8/2008 | Gillula | |
| 2009/0228204 A1 | 9/2009 | Zavoli | |
| 2009/0268947 A1 | 10/2009 | Schaufler | |
| 2010/0013615 A1 | 1/2010 | Herbert et al. | |
| 2010/0191391 A1 | 7/2010 | Zeng | |
| 2012/0310516 A1 | 12/2012 | Zeng | |
| 2013/0091503 A1 | 4/2013 | Painsky | |
| 2014/0358840 A1 | 12/2014 | Tadic | |
| 2014/0379254 A1 | 12/2014 | Miksa | |
| 2015/0073663 A1 | 3/2015 | Nilsson | |
| 2015/0210312 A1 | 7/2015 | Stein | |
| 2015/0268058 A1 | 9/2015 | Samarasekera | |
| 2016/0033297 A1 | 2/2016 | Konishi | |
| 2016/0039409 A1 | 2/2016 | Hayakawa | |
| 2016/0140394 A1 | 5/2016 | Lee et al. | |
| 2016/0140872 A1 | 5/2016 | Palmer | |
| 2016/0223643 A1 | 8/2016 | Li et al. | |
| 2016/0357188 A1 | 12/2016 | Ansari | |
| 2017/0050566 A1 | 2/2017 | Yamashita | |
| 2017/0060810 A1 | 3/2017 | Preston | |
| 2017/0076455 A1 | 3/2017 | Newman | |
| 2017/0080950 A1 | 3/2017 | Pink | |
| 2017/0052032 A1 | 4/2017 | Miksa | |
| 2017/0123428 A1 | 5/2017 | Levinson et al. | |
| 2017/0124781 A1 | 5/2017 | Douillard | |
| 2017/0190334 A1 | 7/2017 | Zelman | |

(56) References Cited

U.S. PATENT DOCUMENTS

| | | |
|---|---|---|
| 2017/0248963 A1 | 8/2017 | Levinson |
| 2017/0261324 A1 | 9/2017 | Roumeliotis |
| 2017/0270361 A1 | 9/2017 | Puttagunta |
| 2017/0329332 A1 | 11/2017 | Pilarski et al. |
| 2017/0343356 A1 | 11/2017 | Roumeliotis |
| 2018/0003512 A1 | 1/2018 | Lynch |
| 2018/0024565 A1 | 1/2018 | Fridman |
| 2018/0032078 A1* | 2/2018 | Ferguson ............ G05D 1/0214 |
| 2018/0032082 A1 | 2/2018 | Shalev-Shwartz |
| 2018/0172454 A1 | 6/2018 | Ghadiok et al. |
| 2018/0188043 A1* | 7/2018 | Chen ..................... G01C 11/30 |
| 2018/0202815 A1 | 7/2018 | Asai |

OTHER PUBLICATIONS

T. M. Chan. "Optimal output-sensitive convex hull algorithms in two and three dimensions." Discrete and Computational Geometry, vol. 16, Issue No. 4, pp. 361-368, Jan. 1, 1996.

Hyunggi Cho, Young-Woo Seo, BVK Vijaya Kumar, and Ragunathan Raj Rajkumar. "A multi-sensor fusion system for moving object detection and tracking in urban driving environments." IEEE International Conference on Robotics and Automation (ICRA), pp. 1836-1843. IEEE, May 2014.

N. Dalai and B. Triggs. "Histograms of oriented gradients for human detection." IEEE Computer Society Conference on Computer Vision and Pattern Recognition (CVPR'05), vol. 1, pp. 886-893, Jun. 2005.

Martin Ester, Hans peter Kriegel, Jrg Sander, and Xiaowei Xu. "A density-based algorithm for discovering clusters in large spatial databases with noise." pp. 226-231. Proc. 2nd Int. Conf. Knowledge Discovery and Data Mining (KDD'96), American Association for Artificial Intelligence (AAAI) Press, Aug. 1996.

K. C. Fuerstenberg, K. C. J. Dietmayer, and V. Willhoeft. "Pedestrian recognition in urban traffic using a vehicle based multilayer laserscanner" IEEE Intelligent Vehicle Symposium, vol. 1, pp. 31-35, Jun. 2002.

Daniel Gohring, Miao Wang, Michael Schnurmacher, and Tinosch Ganjineh. "Radar/lidar sensor fusion for car-following on highways." IEEE 2011 5th International Conference on Automation, Robotics and Applications (ICARA), pp. 407-412, Dec. 2011.

John A Hartigan and Manchek A Wong. "Algorithm as 136: A k-means clustering algorithm." Journal of the Royal Statistical Society. Series C (Applied Statistics), vol. 28, issue 1, pp. 100-108, Jan. 1979.

S. C. Johnson. "Hierarchical clustering schemes." Psychometrika, vol. 32, issue 3, pp. 241-254, Sep. 1967.

N. Kaempchen, M. Buehler, and K Dietmayer. "Feature-level fusion for freeform object tracking using laserscanner and video." Intelligent Vehicles Symposium, IEEE Proceedings, pp. 453-458, Jun. 2005.

Nico Kaempchen and Klaus Dietmayer. "Data synchronization strategies for multi-sensor fusion." Intelligent Transportation Systems, Proceedings of the IEEE Conference, pp. 1-9, Oct. 2003.

Nico Kampchen. "Feature-level fusion of laser scanner and video data for advanced driver assistance systems." University of Ulm Faculty, Engineering Sciences, Computer Science, Jun. 2007.

D. Kellner, M. Barjenbruch, K. Dietmayer, J. Klappstein, and J. Dickmann. "Instantaneous lateral velocity estimation of a vehicle using doppler radar." Information Fusion, Proceedings of the 16th International Conference, pp. 877-884, Jul. 2013.

P. Kmiotek and Y. Ruichek. "Representing and tracking of dynamics objects using oriented bounding box and extended kalman filter." 11th International IEEE Conference on Intelligent Transportation Systems, pp. 322-328, Oct. 2008.

S. Lange, F. Ulbrich, and D. Goehring. "Online vehicle detection using deep neural networks and lidar based preselected image patches." IEEE Intelligent Vehicles Symposium (IV), pp. 954-959, Jun. 2016.

H. A. Loeliger, J. Dauwels, J. Hu, S. Korl, L. Ping, and F. R. Kschischang. "The factor graph approach to model-based signal processing." Proceedings of the IEEE, vol. 95, issue 6, pp. 1295-1322, Jun. 2007.

M. Mahlisch, R. Schweiger, W. Ritter, and K. Dietmayer. "Sensorfusion using spatio-temporal aligned video and lidar for improved vehicle detection." IEEE Intelligent Vehicles Symposium, pp. 424-429, Jun. 2006.

Ljubo Mercep. "Context-Centric Design of Automotive Human-Machine Interfaces." PhD thesis, Technische Universiat Munchen. Jan. 2014.

S. Roberts. "Parametric and non-parametric unsupervised cluster analysis." Pattern Recognition. vol. 30, pp. 261-272. Apr. 1996.

J. Sankaran and N. Zoran. Tda2x, a soc optimized for advanced driver assistance systems. Speech and Signal Processing (ICASSP), IEEE International Conference on Acoustics, pp. 2204-2208, May 2014.

R. Schubert, C. Adam, M. Obst, N. Mattern, V. Leonhardt, and G. Wanielik. "Empirical evaluation of vehicular models for ego motion estimation." 2011 IEEE Intelligent Vehicles Symposium (IV), pp. 534-539, Jun. 2011.

Neil Scicluna and Christos-Savvas Bouganis. "ARC 2014: A Multidimensional FPGA-Based Parallel DBSCAN Architecture." ACM Transactions on Reconfigurable Technology and Systems. vol. 9, issue 1, pp. 1-12, Nov. 2015.

Qi Yue Shaobo Shi and Qin Wang. "Fpga based accelerator for parallel dbscan algorithm." Computer Modelling & New Technologies. vol. 18, issue 2, pp. 135-142, Jan. 2014.

Z. Taylor and J. Nieto. "Motion-based calibration of multimodal sensor extrinsics and timing o_set estimation." IEEE Transactions on Robotics. vol. 32, issue 5, pp. 1215-1229, Oct. 2016.

Rui Xu and D. Wunsch, II. "Survey of clustering algorithms." Trans. Neur. Netw. vol. 16, issue 3, pp. 645-678, May 2005.

Christopher M. Bishop. "Pattern Recognition and Machine Learning (Information Science and Statistics)." Springer-Verlag New York, Inc., Secaucus, NJ,USA, pp. 423-435, pp. 423-435, Aug. 2006.

Judea Pearl. "Probabilistic Reasoning in Intelligent Systems: Networks of Plausible Inference." Morgan Kaufmann Publishers Inc., San Francisco, CA, USA, p. 116-123, Sep. 1988.

David L. Hall and Sonya A. H. McMullen. "Mathematical techniques in multisensor data fusion." Artech House Information Warfare Library. pp. 1-4, Feb. 2004.

Fredrik Sandblom et al, "Sensor Data Fusion for Multiple Configurations", 2014Ieee Intelligent Vehicles Syposium Proceedings, Jun. 8, 2014, pp. 1325-1331.

N. Floudas et al: "Multi-Sensor Coordination and Fusion for Automotive Safety Applications", 20069th International Conference on Information Fusion, Fusion 2006 Inst. of Elec. and Elec. Eng. Computer Society US, IEEE, Piscataway, NJ, USA, Jul. 31, 2006, pp. 1-8.

C. Coue et al: "Using Bayesian Programming for Multi-sensor Multi-target Tracking in Automotive Applications"; Proceedings / 2003 IEEE International Conference on Robotics and Automation : Sep. 14-19, 2003. The Grand Hotel Taipei, Taiwan; [Proceedings of the IEEE International Conference on Robotics and Automation], IEEE Service Center. Piscataway, NJ. ; vol. 2, pp. 2104-2109.

Weiss K et al: "Target modeling and dynamic classification for adaptive sensor data fusion"; Proc. IEEE Intelligent Vehicle Symposium 2003 ; Jun. 9, 2003 (Jun. 9, 2003), pp. 132-137.

Aeberhard Michael et al: "Experience, Results and Lessons Learned from Automated Driving on Germany's Highways", IEEE Intelligent Transportation Systems Magazine, IEEE, USA, vol. 7, No. 1, Apr. 1, 2015 pp. 42-57.

Abramov Alexey et al: "Multi-lane perception using feature fusion based on GraphSLAM", 2016 IEEE/RSJ International Conference on Intelligent Robots and Systems (I ROS), I EEE, Oct. 9, 2016, pp. 3108-3115.

* cited by examiner

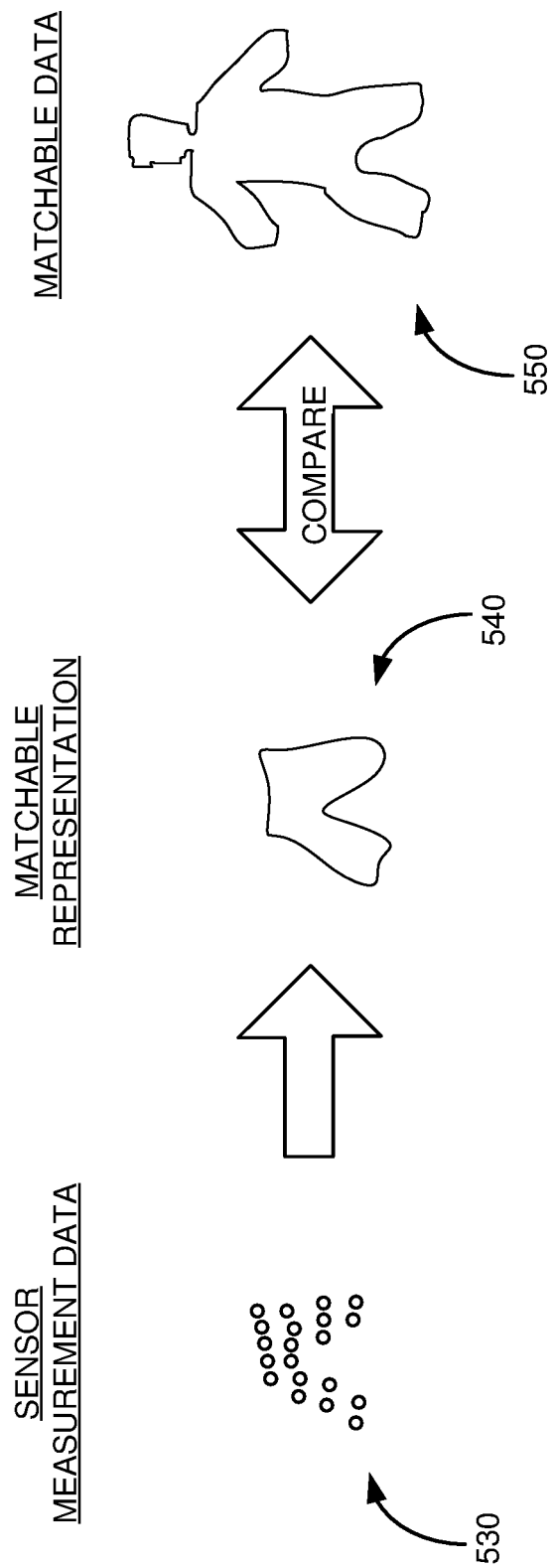

TRAINING OF MACHINE LEARNING SENSOR DATA CLASSIFICATION SYSTEM

RELATED APPLICATION

This patent application claims priority to U.S. Provisional Patent Application No. 62/492,416, filed May 1, 2017, which is incorporated by reference herein.

TECHNICAL FIELD

This application is generally related to automated driving and assistance systems and, more specifically, to training of a machine learning sensor data classification system.

BACKGROUND

Many modern vehicles include built-in advanced driver assistance systems (ADAS) to provide automated safety and/or assisted driving functionality. For example, these advanced driver assistance systems can have applications to implement adaptive cruise control, automatic parking, automated braking, blind spot monitoring, collision avoidance, driver drowsiness detection, lane departure warning, or the like. The next generation of vehicles can include autonomous driving (AD) systems to control and navigate the vehicles independent of human interaction.

These vehicles typically include multiple sensors, such as one or more cameras, a Light Detection and Ranging (LIDAR) sensor, a Radio Detection and Ranging (RADAR) system, ultrasonic sensor, or the like, to measure different portions of the environment around the vehicles. Each sensor processes their own measurements captured over time to detect an object within their field of view, and then provide a list of detected objects to an application in the advanced driver assistance systems or the autonomous driving systems to which the sensor is dedicated. In some instances, the sensors can also provide a confidence level corresponding to their detection of objects on the list based on their captured measurements.

The applications in the advanced driver assistance systems or the autonomous driving systems can utilize the list of objects received from their corresponding sensors and, in some cases, the associated confidence levels of their detection, to implement automated safety and/or driving functionality. For example, when a RADAR sensor in the front of a vehicle provides the advanced driver assistance system in the vehicle a list having an object in a current path of the vehicle, the application corresponding to front-end collision in the advanced driver assistance system can provide a warning to the driver of the vehicle or control vehicle in order to avoid a collision with the object.

Because each application has dedicated sensors, the application can receive a list of objects from the dedicated sensors that provides the application a fixed field of view in a portion of the vehicle. When multiple sensors for an application have at least partially overlapping fields of view, the application can integrate object lists from its multiple dedicated sensors for the fixed field of view around the portion of the vehicle for the application. Since the vehicle moves, however, having a narrow field of view provided from the sensors can leave the application blind to potential objects. Conversely, widening the field of view can increase cost, for example, due to additional dedicated sensors, and add data processing latency.

SUMMARY

This application discloses training of a classification system for an assisted or automated driving system of a vehicle. A processing system can label sensor measurement data collected by sensors mounted in the vehicle with classifications, which can include a type of an object associated with the sensor measurement data and a confidence level of the classification. A training system can utilize the classifications labeled to the sensor measurement data to train a classification graph utilized by the classification system. The training system can select a node in a classification graph based, at least in part, on a classification labeled to sensor measurement data. The training system can compare the sensor measurement data to matchable data in the selected node, and modify the classification graph based, at least in part, on differences between the sensor measurement data and the matchable data in the selected node. Embodiments will be described below in greater detail.

DESCRIPTION OF THE DRAWINGS

FIG. 5B illustrates an example flow for comparing sensor measurement data to matchable data in a node of classification graph according to various embodiments.

DETAILED DESCRIPTION

Sensor Fusion For Autonomous Driving

Figure 1:
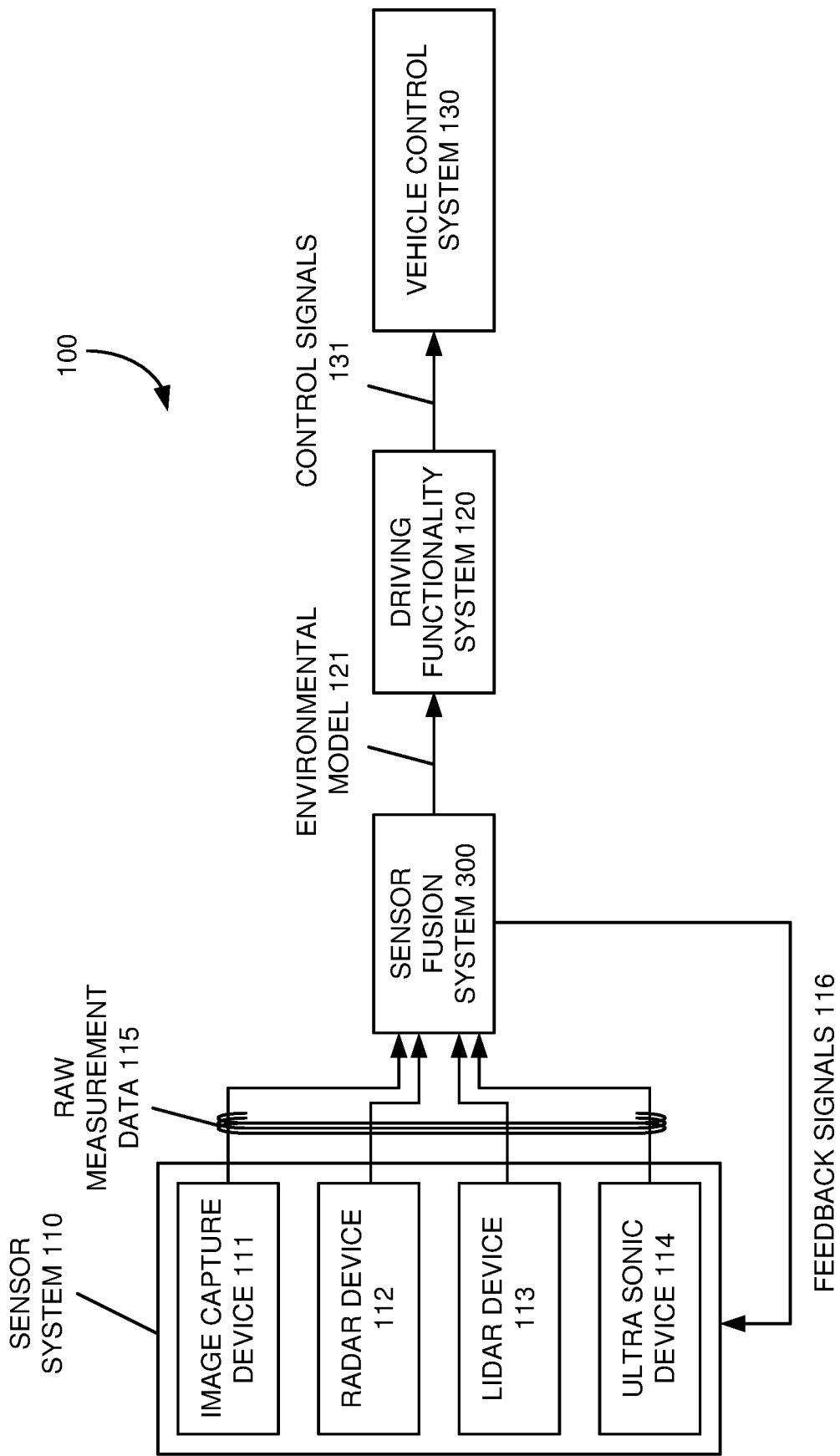
FIG. 1 illustrates an example autonomous driving system according to various embodiments.

FIG. 1 illustrates an example autonomous driving system 100 according to various embodiments. Referring to FIG. 1, the autonomous driving system 100, when installed in a vehicle, can sense an environment surrounding the vehicle and control operation of the vehicle based, at least in part, on the sensed environment.

The autonomous driving system 100 can include a sensor system 110 having multiple sensors, each of which can measure different portions of the environment surrounding the vehicle and output the measurements as raw measurement data 115. The raw measurement data 115 can include characteristics of light, electromagnetic waves, or sound captured by the sensors, such as an intensity or a frequency of the light, electromagnetic waves, or the sound, an angle of reception by the sensors, a time delay between a transmission and the corresponding reception of the light, electromagnetic waves, or the sound, a time of capture of the light, electromagnetic waves, or sound, or the like.

The sensor system 110 can include multiple different types of sensors, such as an image capture device 111, a Radio Detection and Ranging (RADAR) device 112, a Light Detection and Ranging (LIDAR) device 113, an ultra-sonic device 114, one or more microphones, infrared or night-vision cameras, time-of-flight cameras, cameras capable of detecting and transmitting differences in pixel intensity, or the like. The image capture device 111, such as one or more cameras or event-based cameras, can capture at least one image of at least a portion of the environment surrounding the vehicle. The image capture device 111 can output the captured image(s) as raw measurement data 115, which, in some embodiments, can be unprocessed and/or uncompressed pixel data corresponding to the captured image(s).

The RADAR device 112 can emit radio signals into the environment surrounding the vehicle. Since the emitted radio signals may reflect off of objects in the environment, the RADAR device 112 can detect the reflected radio signals incoming from the environment. The RADAR device 112 can measure the incoming radio signals by, for example, measuring a signal strength of the radio signals, a reception angle, a frequency, or the like. The RADAR device 112 also can measure a time delay between an emission of a radio signal and a measurement of the incoming radio signals from the environment that corresponds to emitted radio signals reflected off of objects in the environment. The RADAR device 112 can output the measurements of the incoming radio signals as the raw measurement data 115.

The LIDAR device 113 can transmit light, such as from a laser or other optical transmission device, into the environment surrounding the vehicle. The transmitted light, in some embodiments, can be pulses of ultraviolet light, visible light, near infrared light, or the like. Since the transmitted light can reflect off of objects in the environment, the LIDAR device 113 can include a photo detector to measure light incoming from the environment. The LIDAR device 113 can measure the incoming light by, for example, measuring an intensity of the light, a wavelength, or the like. The LIDAR device 113 also can measure a time delay between a transmission of a light pulse and a measurement of the light incoming from the environment that corresponds to the transmitted light having reflected off of objects in the environment. The LIDAR device 113 can output the measurements of the incoming light and the time delay as the raw measurement data 115.

The ultra-sonic device 114 can emit acoustic pulses, for example, generated by transducers or the like, into the environment surrounding the vehicle. The ultra-sonic device 114 can detect ultra-sonic sound incoming from the environment, such as, for example, the emitted acoustic pulses having been reflected off of objects in the environment. The ultra-sonic device 114 also can measure a time delay between emission of the acoustic pulses and reception of the ultra-sonic sound from the environment that corresponds to the emitted acoustic pulses having reflected off of objects in the environment. The ultra-sonic device 114 can output the measurements of the incoming ultra-sonic sound and the time delay as the raw measurement data 115.

Figure 2A:
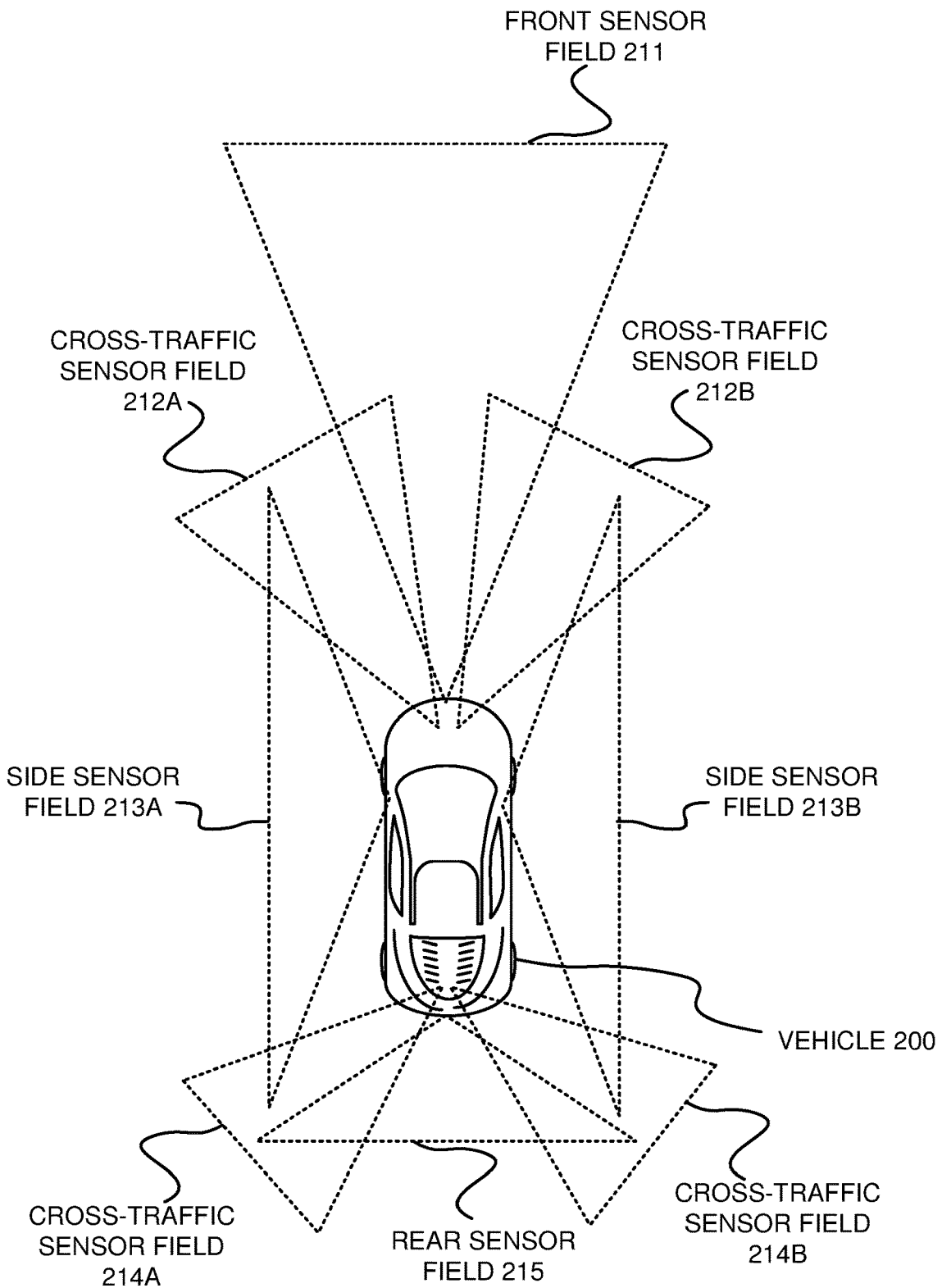
FIG. 2A illustrates an example measurement coordinate fields for a sensor system deployed in a vehicle according to various embodiments.

The different sensors in the sensor system 110 can be mounted in the vehicle to capture measurements for different portions of the environment surrounding the vehicle. FIG. 2A illustrates an example measurement coordinate fields for a sensor system deployed in a vehicle 200 according to various embodiments. Referring to FIG. 2A, the vehicle 200 can include multiple different sensors capable of detecting incoming signals, such as light signals, electromagnetic signals, and sound signals. Each of these different sensors can have a different field of view into an environment around the vehicle 200. These fields of view can allow the sensors to measure light and/or sound in different measurement coordinate fields.

The vehicle in this example includes several different measurement coordinate fields, including a front sensor field 211, multiple cross-traffic sensor fields 212A, 212B, 214A, and 214B, a pair of side sensor fields 213A and 213B, and a rear sensor field 215. Each of the measurement coordinate fields can be sensor-centric, meaning that the measurement coordinate fields can describe a coordinate region relative to a location of its corresponding sensor.

Referring back to FIG. 1, the autonomous driving system 100 can include a sensor fusion system 300 to receive the raw measurement data 115 from the sensor system 110 and populate an environmental model 121 associated with the vehicle with the raw measurement data 115. In some embodiments, the environmental model 121 can have an environmental coordinate field corresponding to a physical envelope surrounding the vehicle, and the sensor fusion system 300 can populate the environmental model 121 with the raw measurement data 115 based on the environmental coordinate field. In some embodiments, the environmental coordinate field can be a non-vehicle centric coordinate field, for example, a world coordinate system, a path-centric coordinate field, a coordinate field parallel to a road surface utilized by the vehicle, or the like.

Figure 2B:
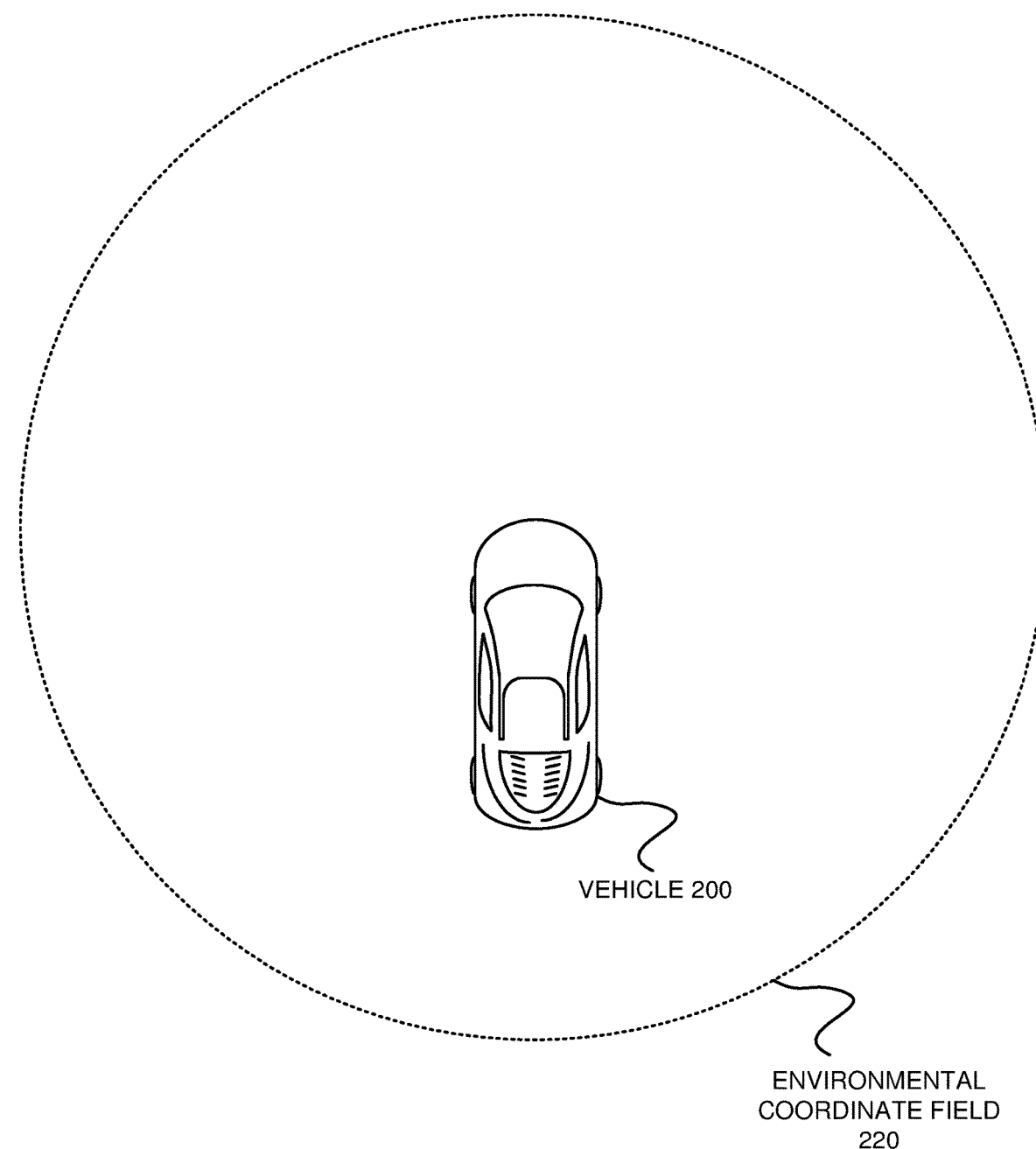
FIG. 2B illustrates an example environmental coordinate field associated with an environmental model for a vehicle according to various embodiments.

FIG. 2B illustrates an example environmental coordinate field 220 associated with an environmental model for the vehicle 200 according to various embodiments. Referring to FIG. 2B, an environment surrounding the vehicle 200 can correspond to the environmental coordinate field 220 for the environmental model. The environmental coordinate field 220 can be vehicle-centric and provide a 360 degree area around the vehicle 200. The environmental model can be populated and annotated with information detected by the sensor fusion system 300 or inputted from external sources. Embodiments will be described below in greater detail.

Referring back to FIG. 1, to populate the raw measurement data 115 into the environmental model 121 associated with the vehicle, the sensor fusion system 300 can spatially align the raw measurement data 115 to the environmental coordinate field of the environmental model 121. The sensor fusion system 300 also can identify when the sensors captured the raw measurement data 115, for example, by time stamping the raw measurement data 115 when received from the sensor system 110. The sensor fusion system 300 can populate the environmental model 121 with the time stamp or other time-of-capture information, which can be utilized to temporally align the raw measurement data 115 in the environmental model 121. In some embodiments, the sensor fusion system 300 can analyze the raw measurement data 115 from the multiple sensors as populated in the environmental model 121 to detect a sensor event or at least one object in the environmental coordinate field associated with the vehicle. The sensor event can include a sensor measurement event corresponding to a presence of the raw measurement data 115 in the environmental model 121, for example, above a noise threshold. The sensor event can include a sensor detection event corresponding to a spatial and/or temporal grouping of the raw measurement data 115 in the environmental model 121. The object can correspond to spatial grouping of the raw measurement data 115 having been tracked in the environmental model 121 over a period of time, allowing the sensor fusion system 300 to determine the raw measurement data 115 corresponds to an object around the vehicle. The sensor fusion system 300 can populate the environment model 121 with an indication of the detected sensor event or detected object and a confidence level of the detection. Embodiments of sensor fusion and sensor event detection or object detection will be described below in greater detail.

The sensor fusion system 300, in some embodiments, can generate feedback signals 116 to provide to the sensor system 110. The feedback signals 116 can be configured to prompt the sensor system 110 to calibrate one or more of its sensors. For example, the sensor system 110, in response to the feedback signals 116, can re-position at least one of its sensors, expand a field of view of at least one of its sensors, change a refresh rate or exposure time of at least one of its sensors, alter a mode of operation of at least one of its sensors, or the like.

The autonomous driving system 100 can include a driving functionality system 120 to receive at least a portion of the environmental model 121 from the sensor fusion system 300. The driving functionality system 120 can analyze the data included in the environmental model 121 to implement automated driving functionality or automated safety and assisted driving functionality for the vehicle. The driving functionality system 120 can generate control signals 131 based on the analysis of the environmental model 121.

The autonomous driving system 100 can include a vehicle control system 130 to receive the control signals 131 from the driving functionality system 120. The vehicle control system 130 can include mechanisms to control operation of the vehicle, for example by controlling different functions of the vehicle, such as braking, acceleration, steering, parking brake, transmission, user interfaces, warning systems, or the like, in response to the control signals.

Figure 3:
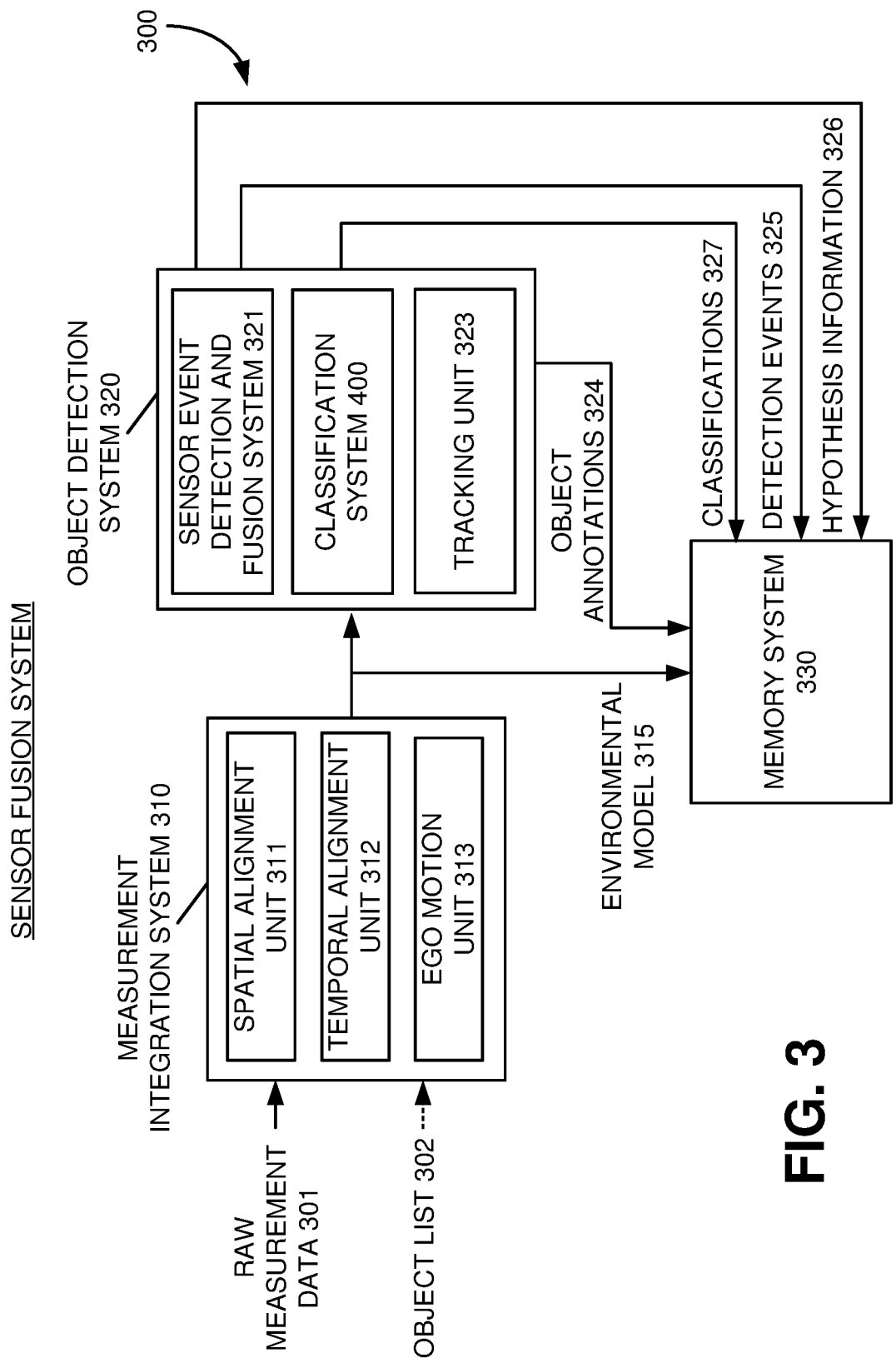
FIG. 3 illustrates an example sensor fusion system according to various examples.

FIG. 3 illustrates an example sensor fusion system 300 according to various examples. Referring to FIG. 3, the sensor fusion system 300 can include a measurement integration system 310 to receive raw measurement data 301 from multiple sensors mounted in a vehicle. The measurement integration system 310 can generate an environmental model 315 for the vehicle, which can be populated with the raw measurement data 301.

The measurement integration system 310 can include a spatial alignment unit 311 to correlate measurement coordinate fields of the sensors to an environmental coordinate field for the environmental model 315. The measurement integration system 310 can utilize this correlation to convert or translate locations for the raw measurement data 301 within the measurement coordinate fields into locations within the environmental coordinate field. The measurement integration system 310 can populate the environmental model 315 with the raw measurement data 301 based on the correlation between the measurement coordinate fields of the sensors to the environmental coordinate field for the environmental model 315.

The measurement integration system 310 also can temporally align the raw measurement data 301 from different sensors in the sensor system. In some embodiments, the measurement integration system 310 can include a temporal alignment unit 312 to assign time stamps to the raw measurement data 301 based on when the sensor captured the raw measurement data 301, when the raw measurement data 301 was received by the measurement integration system 310, or the like. In some embodiments, the temporal alignment unit 312 can convert a capture time of the raw measurement data 301 provided by the sensors into a time corresponding to the sensor fusion system 300. The measurement integration system 310 can annotate the raw measurement data 301 populated in the environmental model 315 with the time stamps for the raw measurement data 301. The time stamps for the raw measurement data 301 can be utilized by the sensor fusion system 300 to group the raw measurement data 301 in the environmental model 315 into different time periods or time slices. In some embodiments, a size or duration of the time periods or time slices can be based, at least in part, on a refresh rate of one or more sensors in the sensor system. For example, the sensor fusion system 300 can set a time slice to correspond to the sensor with a fastest rate of providing new raw measurement data 301 to the sensor fusion system 300.

The measurement integration system 310 can include an ego motion unit 313 to compensate for movement of at least one sensor capturing the raw measurement data 301, for example, due to the vehicle driving or moving in the environment. The ego motion unit 313 can estimate motion of the sensor capturing the raw measurement data 301, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment surrounding the vehicle.

The ego motion unit 313 can utilize the estimated motion of the sensor to modify the correlation between the measurement coordinate field of the sensor to the environmental coordinate field for the environmental model 315. This compensation of the correlation can allow the measurement integration system 310 to populate the environmental model 315 with the raw measurement data 301 at locations of the environmental coordinate field where the raw measurement data 301 was captured as opposed to the current location of the sensor at the end of its measurement capture.

In some embodiments, the measurement integration system 310 may receive objects or object lists 302 from a variety of sources. The measurement integration system 310 can receive the object list 302 from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The measurement integration system 310 also can receive the objects or an object list 302 from other systems internal to the vehicle, such as from a human machine interface, mapping systems, localization system, driving functionality system, vehicle control system, or the vehicle may be equipped with at least one sensor that outputs the object list 302 rather than the raw measurement data 301.

The measurement integration system 310 can receive the object list 302 and populate one or more objects from the object list 302 into the environmental model 315 along with the raw measurement data 301. The object list 302 may include one or more objects, a time stamp for each object, and optionally include a spatial metadata associated with a location of objects in the object list 302. For example, the object list 302 can include speed measurements for the vehicle, which may not include a spatial component to be stored in the object list 302 as the spatial metadata. When the object list 302 includes a confidence level associated with an object in the object list 302, the measurement integration system 310 also can annotate the environmental model 315 with the confidence level for the object from the object list 302.

The sensor fusion system 300 can include an object detection system 320 to receive the environmental model 315 from the measurement integration system 310. In some embodiments, the sensor fusion system 300 can include a memory system 330 to store the environmental model 315 from the measurement integration system 310. The object detection system 320 may access the environmental model 315 from the memory system 330.

The object detection system 320 can analyze data stored in the environmental model 315 to detect at least one object. The sensor fusion system 300 can populate the environment model 315 with an indication of the detected object at a location in the environmental coordinate field corresponding to the detection. The object detection system 320 can identify confidence levels corresponding to the detected object, which can be based on at least one of a quantity, a quality, or a sensor diversity of raw measurement data 301 utilized in detecting the object. The sensor fusion system 300 can populate or store the confidence levels corresponding to the detected objects with the environmental model 315. For example, the object detection system 320 can annotate the environmental model 315 with object annotations 324 or the object detection system 320 can output the object annotations 324 to the memory system 330, which populates the environmental model 315 with the detected object and corresponding confidence level of the detection in the object annotations 324.

The object detection system 320 can include a sensor event detection and fusion system 321 to identify detection events 325 from the data stored in the environmental model 315. In some embodiments, the sensor event detection and fusion system 400 can identify the detection events 325 by analyzing the data stored in the environmental model 315 on a per-sensor type basis to identify patterns in the data, such as image features or data point clusters. When the sensor event detection and fusion system 321 utilizes patterns from a single sensor modality or type to generate the detection events 325, the detection event 325 may be called a sensor detection event. In some embodiments, the sensor event detection and fusion system 321 also can associate or correlate identified patterns across multiple different sensor modalities or types to generate the detection event 325, which can be called a fused sensor detection event.

The sensor event detection and fusion system 321 also can determine differences from adjacent frames or scans of the sensor measurement data on a per-sensor-type basis. For example, the sensor event detection and fusion system 321 can compare the received sensor measurement data from a type of sensor against sensor measurement data from a previously received frame or scan from that type of sensor to determine the differences from adjacent frames or scans of the sensor measurement data. The sensor event detection and fusion system 321 can perform this inter-frame and intra-modality comparison of the sensor measurement data based, at least in part, on the spatial locations of the sensor measurement data in the environmental model 315. For example, when an image capture sensor provides entire image frames, the sensor event detection and fusion system 321 can cache the entire image frames, determine inter-frame differences for the sensor measurement data from a plurality of the cached image frames. In another example, when an image capture sensor provided event-based pixels, the sensor event detection and fusion system 321 can perform pixel caching to generate an entire image from the image data. The sensor event detection and fusion system 321 can utilize the event-based pixels as the inter-frame differences in the sensor measurement data. In another example, when one or more of the RADAR sensors provides raw signal data in a frequency domain, the sensor event detection and fusion system 321 can detect one or more untracked targets from RADAR measurements. The sensor event detection and fusion system 321 can determine differences between the untracked targets in adjacent frames, which can constitute inter-frame differences in the sensor measurement data for the RADAR sensor modality.

The sensor event detection and fusion system 321 also can generate hypothesis information 326 corresponding to the detection events 325. In some embodiments, the hypothesis information 326 can identify confidence levels corresponding to various properties or characteristics associated with the detection events 325. The properties or characteristics associated with the detection events 325 can include unity, velocity, orientation, measurement-based virtual center of gravity, existence, size, novelty, or the like, of the sensor measurement data corresponding to the detection event 325. The unity characteristic can identify whether the sensor measurement data corresponds to a single possible object or multiple possible objects. For example, the unity characteristic can identify when one possible object in the sensor measurement data occludes or blocks visibility to at least another possible object. The velocity characteristic can identify at least one velocity associated with the sensor measurement data. The orientation characteristic can identify a directionality of the sensor measurement data and/or an angle associated with the possible object relative to the vehicle. The measurement-based virtual center of gravity characteristic can identify a center of the possible object, for example, based on a density of the data points associated with the detection event 325. The existence characteristic can identify whether the possible object identified by the detection event 325 is an actual object proximate to the vehicle. The size characteristic can identify or estimate a real size of the possible object associated with the detection event 325. The novelty characteristic can identify whether the detection event 325 corresponds to a newly detected pattern or corresponding to a previous detection event 325.

The sensor fusion system 300 can populate or store the detection events 325 and the corresponding hypothesis information 326 with the environmental model 315. For example, the object detection system 320 can annotate the environmental model 315 with the detection events 325 and the corresponding hypothesis information 326, or the object detection system 320 can output the detection events 325 and the corresponding hypothesis information 326 to the memory system 330, which populates the environmental model 315 with the detection events 325 and the corresponding hypothesis information 326.

The object detection system 320 can include a classification system 400 to classify sensor measurement data associated with the detection events 325. In some embodiments, the classification system 400 can assign classifications 327 to the detection events 325 based on the classification of the sensor measurement data associated with the detection events 325. The classifications 327 can correspond to a type of object associated with the detection events 325, such as another vehicle, a pedestrian, a cyclist, an animal, a static object, or the like, which may be identified or pointed to by the hypothesis information 326. The classifications 327 also can include a confidence level associated with the classification and/or include more specific information corresponding to a particular pose, orientation, state, or the like, of the object type. The object detection system 320 can annotate the environmental model 315 with classifications 327 or the object detection system 320 can output the classifications 327 to the memory system 330, which populates the environmental model 315 with the classifications 327.

The classification system 400 can implement one or more object models, each to describe a type of object capable of being located proximate to the vehicle. The object models can include matchable data for different object types, and include poses, orientations, transitional states, potential deformations for the poses or orientations, textural features, or the like, to be compared against the sensor measurement data. The classification system 400 can compare the sensor measurement data (or a modified representation of the sensor measurement data) associated with the detection events 325 to one or more of the object models, and generate the classifications 327 based on the comparison.

In some embodiments, the classification system 400 can perform the classification utilizing a machine learning object classifier. The machine learning object classifier can include multiple classification graphs or tensor graphs, for example, each to describe a different object model. In some embodiments, a classification graph can include multiple nodes, each configured to include matchable data corresponding to a subset of the various poses, orientations, transitional states, potential deformations, textural features, or the like, in the object model. The classification system 400 also can perform the classification utilizing other computational techniques, such as a feed-forward neural network, a support vector machine (SVM), or the like.

The classification system 400 can select one or more of the classification graphs based, at least in part, on the detection events 325 and/or the hypothesis information 326. The classification system 400 can traverse nodes in the selected classification graphs, for example, with each node performing a comparison between a portion of the matchable data in the object model to the sensor measurement data (or a modified representation of the sensor measurement data). In some embodiments, the traversal of node can span across classification graphs, for example, where a node in one classification graph can directly provide information to a node in a different classification graph. Each node in the classification graphs can generate a match distance, for example, by generating a confidence level that the sensor measurement data corresponds to the matchable data of the node. The classification system 400 can utilize the match distances from the nodes to generate the classification 327 for the sensor measurement data associated with the detection events. The classification system 400 can utilize the match distances to control the traversal through the nodes in the selected classification graphs, for example, deciding which nodes should attempt to classify the sensor measurement data and in what order, when to cease having nodes attempt to classify the sensor measurement data, or the like. Embodiments of the sensor measurement data classification will be described below in greater detail.

The object detection system 320 can include a tracking unit 323 to track the detection events 325 in the environmental model 315 over time, for example, by analyzing the annotations in the environmental model 315, and determine whether the detection events 325 corresponds to objects in the environmental coordinate system. In some embodiments, the tracking unit 323 can utilize the classifications 327 to track the detection events 325 with at least one state change prediction model, such as a kinetic model, a probabilistic model, or other state change prediction model.

The tracking unit 323 can select the state change prediction model to utilize to track the detection events 325 based on the assigned classifications 327 of the detection events 325. The state change prediction model may allow the tracking unit 323 to implement a state transition prediction, which can assume or predict future states of the detection events 325, for example, based on a location of the detection events 325 in the environmental model 315, a prior movement of the detection events 325, a classification of the detection events 325, or the like. In some embodiments, the tracking unit 323 implementing the kinetic model can utilize kinetic equations for velocity, acceleration, momentum, or the like, to assume or predict the future states of the detection events 325 based, at least in part, on its prior states.

The tracking unit 323 may determine a difference between the predicted future states of the detection events 325 and its actual future states, which the tracking unit 323 may utilize to determine whether the detection events 325 correspond to objects proximate to the vehicle. The tracking unit 323 can track the detection event 325 in the environmental coordinate field associated with the environmental model 315, for example, across multiple different sensors and their corresponding measurement coordinate fields.

When the tracking unit 323, based on the tracking of the detection events 325 with the state change prediction model, determines the detection events 325 are trackable, the tracking unit 323 can annotate the environmental model 315 to indicate the presence of trackable detect events. The tracking unit 323 can continue tracking the trackable detect events over time by implementing the state change prediction models and analyzing the environmental model 315 when updated with additional raw measurement data 301. After annotating the environmental model 315 to indicate the presence of trackable detect events, the tracking unit 323 can continue to track the trackable detect events in the environmental coordinate field associated with the environmental model 315, for example, across multiple different sensors and their corresponding measurement coordinate fields.

The memory system 330 can be accessible by different portions of the autonomous driving system 100, such as a driving functionality system, which can include a localization system, a situational awareness system, or the like. The sensor fusion system 300 can produce data, such as the environmental model 315, object annotations 324, classifications 327, detection events 325, hypothesis information 326, or the like, and portions of the driving functionality system can consume data, for example, via access to the memory system 330. In some embodiments, the sensor fusion system 300 can include a system to output the produced data to the consuming systems based on a subscription basis or in an event-driven manner.

The consuming systems, such as the localization system or the situational awareness system, also can send requests to the sensor fusion system 300 for operations to be performed on data within the memory system 330. For example, the sensor fusion system 300 can be requested to perform in-depth classification of a portion of the data in the memory system 330. The sensor fusion system 300 can prompt the classification system 400 to perform the classification of the requested data and output the results to the requesting system. For example, the situational awareness system may consume data from the memory system indicating that another vehicle is in front of the vehicle including the autonomous driving system 100, and request the sensor fusion system 300 classify the signal lights of that target vehicle, such as blinkers, brake lights, reverse lights, or the like. The sensor fusion system 300 can prompt the classification system 400 to identify locations of the signal lights in data of the target vehicle, and classify their state. Once classified by the classification system 400, the sensor fusion system 300 can output the classification to the requesting system or add the classification to the environmental model 315, where it is available for other vehicle systems.

Classification of Sensor Measurement Data by a Sensor Fusion System

Figure 4:
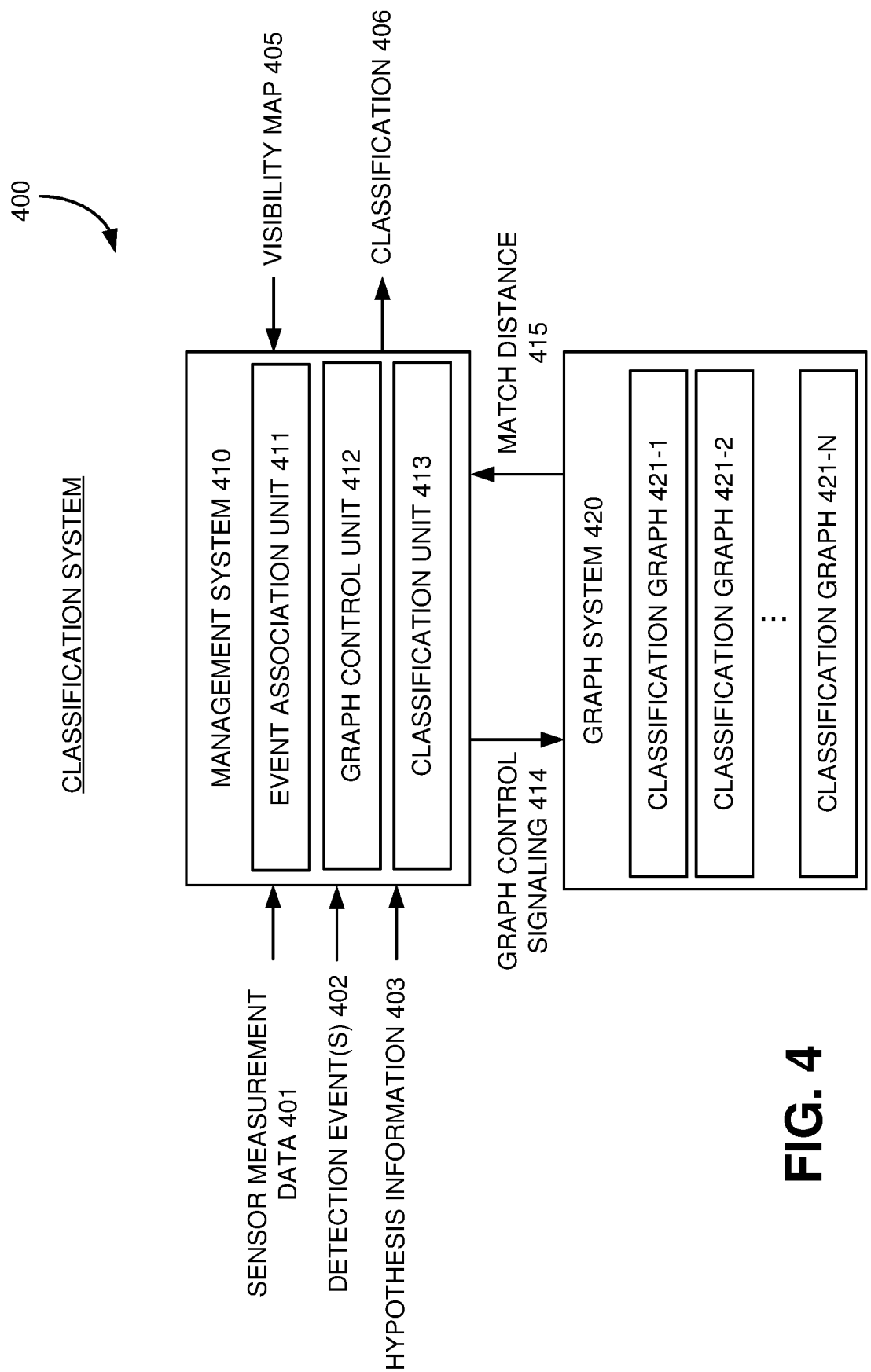
FIG. 4 illustrates an example classification system in a sensor fusion system according to various embodiments.

FIG. 4 illustrates an example classification system 400 in a sensor fusion system according to various embodiments. Referring to FIG. 4, the classification system 400 can include a management system 410 and a graph system 420, which can operate in conjunction to generate a classification 406 for sensor measurement data 401. The classification 406 can identify to a type of object associated with the sensor measurement data 401, such as another vehicle, a pedestrian, a cyclist, an animal, a static object, or the like. The classification 406 also can include a confidence level associated with the identification of the object type and/or include more specific information corresponding to a particular pose, orientation, state, or the like, of the object type.

The graph system 420 can define one or more object models describing different types of objects capable of being located proximate to the vehicle, such as another vehicle, a pedestrian, a cyclist, an animal, a static object, or the like. The object models can include matchable data for different object types, and include poses, orientations, transitional states, potential deformations for the poses or orientations, textural features, or the like, to be compared against the sensor measurement data.

The management system 410 can select one or more of the object models to utilize in the generation of the classification 406 for the sensor measurement data 401. The management system 410 can prepare the sensor measurement data 401 for comparison to the selected object models, and direct the graph system 420 via graph control signaling 414 to apply the selected object models to the prepared version of the sensor measurement data 401. The graph system 420 can generate at least one match distance 415 based on the application of the prepared version of the sensor measurement data 401 to the selected object models, and the management system 410 can generate the classification 406 for the sensor measurement data 401 based, at least in part, on the match distance 415 from the graph system 420.

The management system 410 can receive the sensor measurement data 401, detection events 402, and hypothesis information 403, for example, included in an environmental model for the vehicle including the sensor fusion system. The sensor measurement data 401 can be collected from multiple different sensor modalities and can temporally and spatially align into the environmental model. The detection events 402 and the hypothesis information 403 can describe properties or characteristics of at least a portion of the sensor measurement data 401.

The management system 410, in some embodiments, can generate a matchable representation of the sensor measurement data 401. The matchable representation of the sensor measurement data 401 can be based on data captured from any or all sensor modalities. The matchable representation of the sensor measurement data 401 can include a two-dimensional shape description of the sensor measurement data 401, three-dimensional structure description of the sensor measurement data 401, a textural description of the sensor measurement data 401, a geometric description of the sensor measurement data 401, a structural or skeletonized description of the sensor measurement data 401, include reflectivity features, or the like. In some embodiments, the management system 410 can perform skeleton extraction on the sensor measurement data 401, which can divide an object in the sensor measurement data 401 into different segments and include a connectivity graph to identify how the different segments were linked in the sensor measurement data 401. For example, the management system 410 can generate a shape outline or structural body corresponding to the sensor measurement data 401, and thin the shape outline or structural body into lines. The management system 410 can identify points associated with the lines, such as endpoint, vertices where multiple lines connect, or the like. The management system 410 can generate the skeleton of the sensor measurement data 401 from the lines, the identified points, and relationships between the lines or connectivity of the lines. In some embodiments, the management system 410 can generate the lines directly from the sensor measurement data 401, for example, generate lines connecting data points in the sensor measurement data 401.

The management system 410 also can extract geometric primitives, such as U-shapes, L-shapes, curves, or the like, from the sensor measurement data 401, and include them in the matchable representation of the sensor measurement data 401. In some embodiments, the management system can determine a boundary outline for the sensor measurement data 401 and creating surface area data within the boundary outline based, at least in part, on the sensor measurement data 401. For example, the management system 410 can close or fill-in the surface area of the boundary outline by expanding existing data points in the sensor measurement data 401, connecting existing data points in the sensor measurement data 401, or the like. The management system 410 also can identify textural features from the sensor measurement data 401, for example, by utilizing a Histogram of Oriented Gradients (HOG), Local Binary Patterns (LBP), frequency domain features, Haar-like features using Haar wavelets, or the like, to extract the textural features from the sensor measurement data 401.

The matchable representation of the sensor measurement data 401 can be a two-dimensional representation of the sensor measurement data 401 or a three-dimensional representation of the sensor measurement data 401. When generating the three-dimensional representation of the sensor measurement data 401, certain volumetric aspects of the matchable representation may not be observable from the sensor measurement data 401. In these cases, the management system 410 may estimate the three-dimensional structure associated with the sensor measurement data 401 based, at least in part, on symmetry in the sensor measurement data 401, completeness of the sensor measurement data 401, curvature sensor measurement data 401, the hypothesis information 403, or the like.

The management system 410 also can estimate distances between the vehicle and objects associated with the sensor measurement data 401. In some embodiments, the sensor measurement data 401 can include a distance measurement in the data points, or the management system 410 can ascertain the distance based on the spatial location of the sensor measurement data 401 in the environmental model.

The management system 410 can include an event association unit 411 to determine whether one of the detection events 402 corresponds to one or more detection events 402 previously received by the management system 410. In some embodiments, the event association unit 411 can associate the detection event 402 with the one or more previously received detection events 402 based, at least in part, on their spatial locations relative to each other, sensor update rates, types of sensor measurement data correlated to the detection events 402, a visibility map 405, or the like.

The management system 410 can include a graph control unit 412 to select one or more of the object models implemented by the graph system 420 to utilize in the classification of sensor measurement data 401 associated with one of the detection events 402. In some embodiments, the graph control unit 412 can select object models based, at least in part, on an association between detection events determined by the event association unit 411. For example, a previous success or failure in classifying sensor measurement data 401 associated with one detection event can be utilized to select which object models to utilize in attempting to classify sensor measurement data 401 of another detection event. The graph control unit 412 also can select one or more of the object models based on the hypothesis information 403, processing constraints of hardware implementing the classification system 400, timing constraints associated with generating the classification 406, or the like.

The graph control unit 412 can generate the graph control signaling 414, which can be configured to direct the graph system 420 to apply selected object models to the matchable representation of the sensor measurement data 401. The management system 410 can provide the graph control signaling 414 to the graph system 420 along with the matchable representation of the sensor measurement data 401 and optionally the estimated distance between the vehicle and the sensor measurement data 401.

In some embodiments, the graph system 420 can include multiple classification graphs 421-1 to 421-N, each to implement one or more object models describing types of objects capable of being located proximate to the vehicle, such as another vehicle, a pedestrian, a cyclist, an animal, a static object, or the like. The classification graphs 421-1 to 421-N can each include one or more nodes having matchable data corresponding to a subset of the various poses, orientations, transitional states, potential deformations, textural features, or the like, in the object model. The management system 410 can select the object models by selecting one or more of the classification graphs 421-1 to 421-N or selecting one or more of the nodes in the classification graphs 421-1 to 421-N. Embodiments of a node-based classification graph will be described below in FIG. 5A.

Figure 5A:
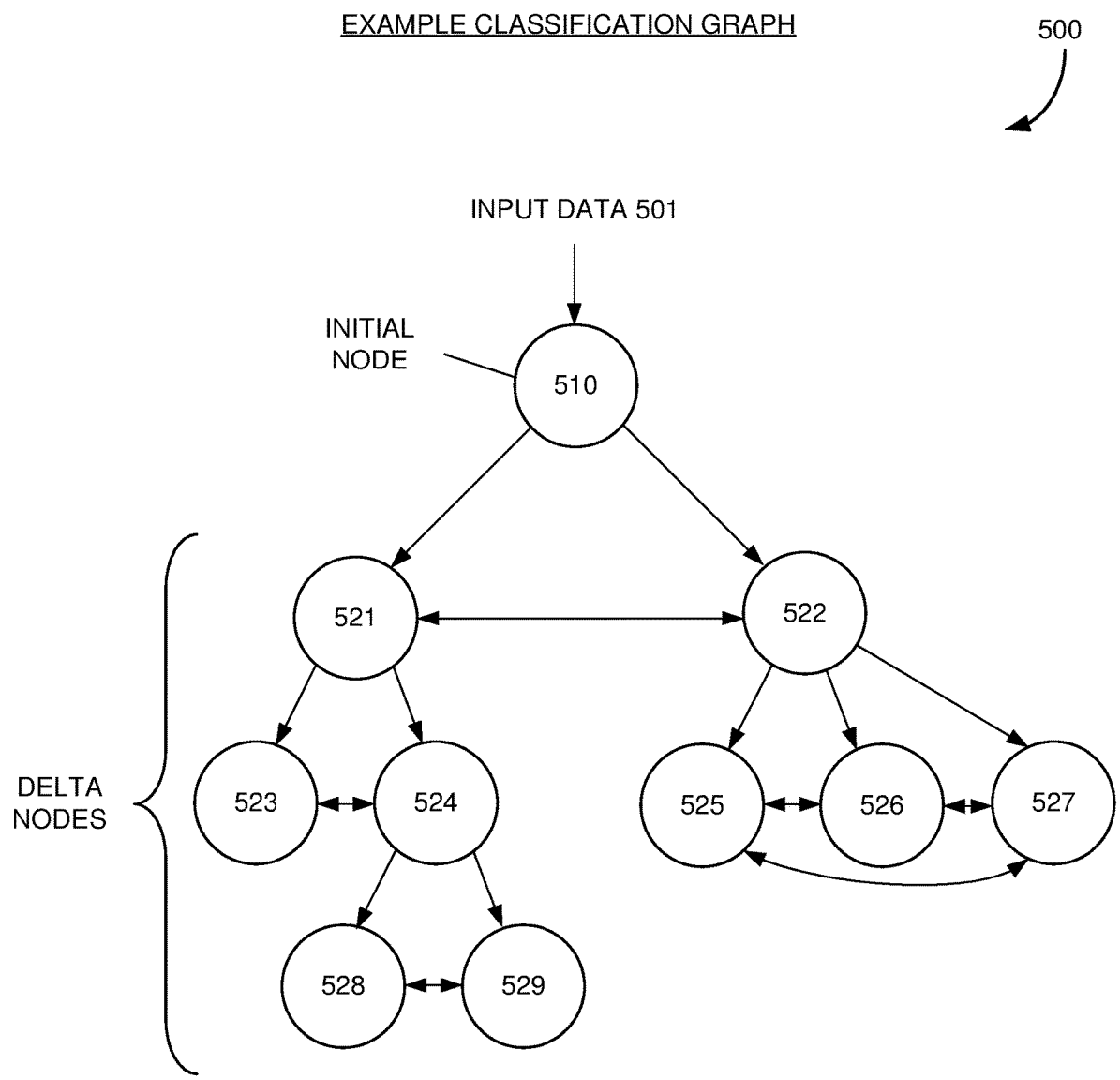
FIG. 5A illustrates an example classification graph in a machine learning object classifier implementation of a classification system according to various examples.

FIG. 5A illustrates an example classification graph 500 in a machine learning object classifier implementation of a classification system according to various examples. Referring to FIG. 5A, the classification graph 500 can include multiple nodes, each configured to include matchable data corresponding to a subset of the various poses, orientations, transitional states, potential deformations, textural features, inter-frame or inter-scan differences, or the like, in the object model. The nodes can compare a matchable representation of sensor measurement data to the matchable data to determine a match distance. In some embodiments, the matchable representation of sensor measurement data can be cross-checked in the computational nodes. For example, a shape in the matchable representation of sensor measurement data can cross-checked with a skeleton in the matchable representation of sensor measurement data to ascertain a congruency between the shape and the skeleton of the matchable representation. In another example, textural features in the matchable representation of sensor measurement data, such as facial features of a pedestrian, can be cross-checked with the skeleton in the matchable representation of sensor measurement data to ascertain congruency between the textural features and the skeleton of the matchable representation, such whether the facial features are located on an expected portion of the skeleton. The match distance can identify an object type associated with the node, such as another vehicle, a pedestrian, a cyclist, an animal, a static object, or the like, and a confidence level that the matchable representation of the sensor measurement data utilized to generate the match distance corresponds to the object type and an amount of object matching to different object segments. The amount of matching can correspond to matching of object structure, object shape, and object texture in different object segments.

The classification graph 500 can arrange or organize the nodes in a variety of formats. For example, the classification graph 500 can arrange the nodes so that they are independent of each other. In the embodiments shown in FIG. 5A, the classification graph 500 can arrange the nodes to be interdependent, for example, to have some nodes corresponding to a coarse-level of detail and other nodes corresponding to finer details for the coarse-level nodes. The classification graph 500 can include an initial node 510 to receive input data 501, such as a matchable representation of sensor measurement data and an estimated distance of the sensor measurement data from the vehicle. The initial node 510 may include matchable data having a coarse-level of detail corresponding to subsets of the various poses, orientations, transitional states, potential deformations, textural features, or the like, in the object model. For example, when the initial node corresponds to a pedestrian, the matchable data may include to a coarse-level outline of a person with a particular pose, orientation, transitional states, potential deformations of the outline, or the like. In some embodiments, the finer details, such as position of hands, fingers, facial details, or the like, may be omitted from the initial node 510.

The classification graph 500 can include delta nodes 521-529, which can receive the input data 501 from the previously executed node. The delta node 521-529 may include matchable data having a finer-level of detail that the initial node 510 corresponding to subsets of the various poses, orientations, transitional states, potential deformations, textural features, or the like, in the object model. In some embodiments, the delta nodes 521-529 may include matchable data corresponding to differences with the initial node 510, for example, to avoid duplicative matching of the matchable representation to the matchable data.

By arranging the nodes in a coarse-level detail to finer-level of detail, the classification system may be able to first determine an object type, for example, that the sensor measurement data corresponds to a person, before determining finer-level details, such as whether the person has a particular orientation, hand position, facial features, or the like. This coarse-level to finer-level detection order can allow the classification system to make the decision when to stop traversing the nodes in the classification graph, re-allocate processing resources to different classification activities, control power consumption, or the like. Although FIG. 5A shows the classification graph 500 including one initial node 510, in some embodiments, the classification graph 500 can include multiple initial nodes and have multiple sets of delta nodes branching from those initial nodes.

Referring back to FIG. 4, each selected node in the graph system 420 can perform a comparison between a portion of the matchable data in the object model to the matchable representation of the sensor measurement data 401, and generate a match distance 415, for example, by generating a confidence level that the matchable representation of the sensor measurement data 401 corresponds to the matchable data of the node. The match distance 415 can identify an object type, such as another vehicle, a pedestrian, a cyclist, an animal, a static object, or the like, and a confidence level that the matchable representation of the sensor measurement data 401 utilized to generate the match distance 415 corresponds to the object type. The match distance 415 also can identify granular information about the object type, for example, corresponding to a pose, an orientation, a state, or the like, of the object type. Embodiments of comparing sensor measurement data 401 to matchable data in a node of classification graph will be described below in FIG. 5B.

FIG. 5B illustrates an example flow for comparing sensor measurement data 530 to matchable data 550 in a node of classification graph according to various embodiments. Referring to FIG. 5B, the sensor measurement data 530 may include a set of data points, such as LIDAR points or point cloud, which a sensor fusion system identified as corresponding to a detection event. As discussed above, the sensor measurement data 530 may be converted into a matchable representation 540, for example, by determining a boundary outline for the sensor measurement data 530 and creating surface area data within the boundary outline based, at least in part, on the sensor measurement data 530. The sensor measurement data 530 also may be converted into a matchable representation 540 by skeletonizing the sensor measurement data 530, for example, by generating a shape outline or structural body corresponding to the sensor measurement data 530, and thin the shape outline or structural body into lines. Different points associated with the lines, such as endpoint, vertices where multiple lines connect, or the like, can be identified, and a skeleton of the sensor measurement data 530 can be generated from the lines, the identified points, and relationships between the lines or connectivity of the lines. In some embodiments, the matchable data 550 can correspond to a vehicle classification, which can allow the sensor measurement data 530 to be viewed from a bird's eye view. The sensor measurement data 530 can be skeletonized in the bird's eye view, for example, by generating lines that connect edges of the sensor measurement data 530. Different points associated with the lines, such as endpoint, vertices where multiple lines connect, or the like, can be identified, and a skeleton of the sensor measurement data 530 can be generated from the lines, the identified points, and relationships between the lines or connectivity of the lines. The skeleton of the sensor measurement data 530 can be included in the matchable representation 540. The matchable representation 540 can be a two-dimensional representation of the sensor measurement data 530 or a three-dimensional representation of the sensor measurement data 530.

The node of the classification graph can compare the matchable representation 540 to matchable data 550 corresponding to a portion of an object model, and generate a match distance to indicate a difference between the matchable representation 540 and the matchable data 550. In some embodiments, the node can divide the matchable data 550 into different portions or segments, for example, using a fixed-size or fixed grid segmentation, a natural segmentation based on the underlying object described by the object model, or the like, and generate the match distance to indicate differences between the matchable representation 540 and the matchable data 550 for each segment or portion.

The node can compare the matchable representation 540 to the matchable data 550 in a number of ways. The comparison by the node can determine an overlap between the matchable representation 540 and the matchable data 550. The node can generate the match distance based, at least in part, on the determined overlap and a significance of the overlapped portions between the matchable representation 540 and the matchable data 550.

The node also can locate and handle occlusions, for example, from a visibility map configured to identify where sensor measurement data can be populated into the environmental model based on a view of the sensors. For example, since each sensor has a measurement coordinate range, the visibility map may identify which portions of environmental model correspond to which measurement coordinate ranges. When the autonomous driving system determines an object, such as pedestrian or vehicle, blocks a portion of a normal measurement coordinate range, the autonomous driving system can update the visibility map to identify the occlusion. The node can utilize the occlusions to determine whether the non-overlapped portions were due to a lack of ability for the sensors to measure a portion of the environment surrounding the vehicle or not. The node can generate the match distance based, at least in part, on the occlusion analysis.

The node can determine whether non-overlapping portions of the matchable representation 540 have a size and shape that would be expected for the object type described by the matchable data 550. For example, when the matchable data 550 corresponds to a pedestrian, the non-overlapping portions may correspond to a particular positioning of the arms. The node can utilize the matchable data 550 to determine whether the arms in the matchable representation have an expected shape and size, for example, have a natural position and/or normal size relative to the matchable data 550. The node can generate the match distance based, at least in part, on whether a size and shape the non-overlapping portions of the matchable representation 540 were expected for the object type described by the matchable data 550.

The node can attempt to deform the matchable data 550 so that portions of the matchable representation 540 overlap. The node can identify which portions of the matchable data 550 can be deformed by the node and to what degree the node can deform them. The deformation may alter the shape and size of the portion of the matchable data 550 within a set of deformation rules for the matchable data 550. The node can generate the match distance based, at least in part, on whether deformation allowed there to be an overlap in the matchable representation 540 and the matchable data 550 and/or a distance of the deformation performed to achieve the overlap.

When the matchable representation 540 corresponds to a detection event associated with at least one previous detection event, the node can determine whether the matchable representation 540 corresponds to an expected state transition compared to a previous state of sensor measurement data for the previous detection event. For example, after a detection event has been previously classified, future detection events associated with that classified detection event can be checked by nodes to determine whether the sensor measurement data in the future detection events corresponds to a state transition from the previous detection event. The node can generate the match distance based, at least in part, on whether the matchable representation 540 match to the matchable data 550 corresponds to an expected state transition.

Referring back to FIG. 4, the management system 410 can receive the match distance 415 from each of the initiated nodes in one or more of the classification graphs 421-1 to 421-N. The management system 410 can include a classification unit 413 to assign a classification 406 to the sensor measurement data 401 associated with the detection events 402 based, at least in part, on at least one of the match distances 415. For example, when the match distance 415 has a confidence level above a predetermined threshold level, the classification unit 413 can generate the classification 406 for the sensor measurement data 401 associated with the detection events 402.

Prior to assigning a classification 406, the management system 410 also may perform a cross-check of the classification against other sensor data. For example, when the graph system 420 generates a match distance 415 based on LIDAR or RADAR data, the management system 410 or the graph system 420 may analyze image data from a camera sensor to confirm the classification identified in the match distance. The management system 410 or the graph system 420 also may generate a perspective view, such as a bird's eye view or an image view, which can overlay sensor measurement data from multiple different sensor modalities. The management system 410 or the graph system 420 may generate perspective or parallel projections of the sensor measurement data 401, such as an orthographic projection onto a ground plane or a perspective projection to the front-facing camera image plane. The management system 410 or the graph system 420 may utilize these generated views or projections to perform cross-checking of the classification indicated from the match distances. In some embodiments, the assignment of the classification 406 or a confidence level associated with the assigned classification 406 also can be based on an assigned classification for any previous detection events associated with the current detection event.

In some embodiments, the classification unit 413 also can select additional nodes in one or more of the classification graphs 421-1 to 421-N to initiate based on the match distances 415, and direct the graph system 420 via the graph control signaling 414. For example, when the match distance 415 has a confidence level below a predetermined threshold level, the classification unit 413 can determine which of the remaining nodes to initiate or traverse towards in one or more of the classification graphs 421-1 to 421-N.

In some embodiments, the traversal through the nodes in the selected classification graphs 421-1 to 421-N, for example, deciding which nodes should attempt to classify the sensor measurement data 401 and in what order, can be performed independently by the graph system 420. The classification unit 413 may utilize the match distance 415 to prompt the graph system 420 to cease traversal for different node paths in the classification graphs 421-1 to 421-N or to direct resources of the graph system 420 towards one or more of the node paths based on the match distances 415.

Figure 6:
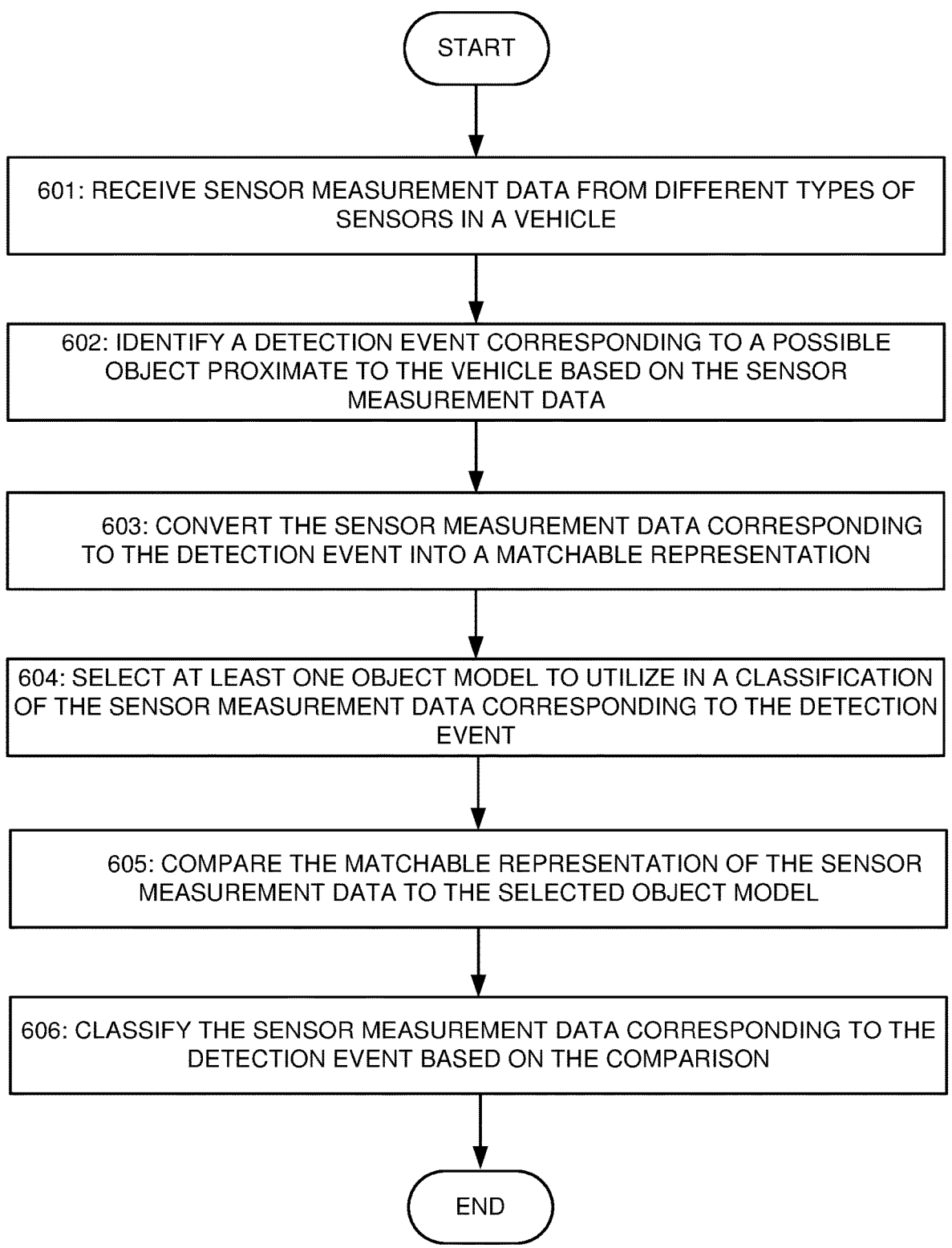
FIG. 6 illustrates an example flowchart for classification of sensor measurement data according to various examples.

FIG. 6 illustrates an example flowchart for classification of sensor measurement data according to various examples. Referring to FIG. 6, in a block 601, a computing system can receive sensor measurement data from different types of sensors in a vehicle. The sensor measurement data can include measurements or raw data from different types or modalities of sensors in a vehicle. For example, the sensor measurement data can include data measured by at least one image capture device, one or more RADAR sensors, one or more LIDAR sensors, one or more ultrasonic sensors, from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication, or the like. The computing system can receive the sensor measurement data in frames or scans over time, such as periodically, intermittently, in response to sensing events, or the like. The computing system can spatially align and temporally align the sensor measurement data in an environmental model.

In a block 602, the computing system can identify detection events corresponding to possible objects proximate to the vehicle based on the sensor measurement data. The computing system can detect patterns in the sensor measurement data indicative of the possible objects proximate to the vehicle, and output the detected patterns as a detection event. In some embodiments, the computing system can compare detected patterns from multiple different sensor modalities, and identify a detection event from the detected patterns based on a spatial-alignment between the detected patterns, a temporal-alignment between the detected patterns, a state of the data in the between the detected patterns, or the like. The state of the data can correspond to a velocity of the data corresponding to the detected patterns, which can be determined by the sensors and included in the sensor measurement data or determined based on the inter-frame differences. When the computing system utilizes a single sensor modality or sensor type to generate a detection event, the detection event may be called a sensor detection event. When the computing system utilizes associated or correlated patterns from multiple different sensor modalities to generate a detection event, the detection event may be called a fused sensor detection event.

The computing system also can generate hypothesis information having confidence levels corresponding to properties of the detection events. The hypothesis information can describe various properties or characteristics associated with the detection events and provide confidence levels corresponding to those properties or characteristics. In some embodiments, the properties or characteristics associated with the detection events can include unity, velocity, orientation, center of gravity, existence, size, and novelty of the sensor measurement data corresponding to the detection event. The unity characteristic can identify whether the sensor measurement data corresponds to a single possible object or multiple possible objects proximate to each other, which can help a machine learning classifier select other node or classification graphs corresponding to different portions of an object model. The velocity characteristic can identify at least one velocity associated with the sensor measurement data. The orientation characteristic can identify a directionality of the sensor measurement data and/or an angle associated with the possible object relative to the vehicle. The center of gravity characteristic can identify a center of the possible object or center of a bounding box corresponding to the sensor measurement data based on a density of the data points associated with the detection event. The existence characteristic can identify whether the possible object identified by the detection event is an actual object proximate to the vehicle. The size characteristic can identify or estimate a real size of the possible object associated with the detection event. The novelty characteristic can identify whether the detection event corresponds to a newly detected pattern or corresponding to a previous detection event.

In a block 603, the computing system can convert the sensor measurement data corresponding to the detection event into a matchable representation. In some embodiments, the computing system can generate the matchable representation of the sensor measurement data by determining a boundary outline for the sensor measurement data and creating surface area data within the boundary outline based, at least in part, on the sensor measurement data. For example, the computing system can close or fill-in the surface area of the boundary outline by expanding existing data points in the sensor measurement data, connecting existing data points in the sensor measurement data, or the like.

The matchable representation of the sensor measurement data can be a two-dimensional representation of the sensor measurement data or a three-dimensional representation of the sensor measurement data. When generating the three-dimensional representation of the sensor measurement data, certain volumetric aspects of the matchable representation may not be observable from the sensor measurement data. In these instances, the computing system may estimate the three-dimensional structure associated with the sensor measurement data based, at least in part, on symmetry in the sensor measurement data, completeness of the sensor measurement data, curvature sensor measurement data, the hypothesis information, or the like.

In a block 604, the computing system can select at least one object model to utilize in a classification of the sensor measurement data corresponding to the detection event. In some embodiments, the computing system can select object models based, at least in part, on an association of the detection event and a previously-received detect event. For example, a previous success or failure in classifying sensor measurement data associated with one detection event can be utilized to select which object models to utilize in attempting to classify sensor measurement data of this instant detection event. The computing system also can select one or more of the object models based on the hypothesis information, processing constraints of computing system hardware, timing constraints associated with generating the classification, or the like.

In a block 605, the computing system can compare the matchable representation of the sensor measurement data to the selected object model. The object model can include matchable data for a certain object type, which can have various poses, orientations, transitional states, potential deformations for the poses or orientations, textural features, or the like. The computing system can compare the matchable representation of the sensor measurement data to the matchable data from the selection object model, and generate a match distance based on the comparison. In some embodiments, the match distance can correspond to an overlap between the matchable representation and the matchable data, a significance of the overlapped portions, differences between the matchable representation and the matchable data in the non-overlapped portions, whether the matchable data can be deformed to overlap the matchable representation, whether the matchable representation corresponds to an expected state transition for a previously-received detection event, or the like.

In a block 606, the computing system can classify the sensor measurement data corresponding to the detection event based, at least in part, on the comparison. The computing system can receive the match distance from the comparison and classify the sensor measurement data based on the match distance. In some embodiments, the computing system can cross-check a classification indicated by the match distance against additional sensor data, such as image data, in an attempt to confirm the classification indicated by the match distance. In some embodiments, the computing system can generate the classification based, at least in part, on an association of the detection event and a previously-classified detect event.

Training of a Machine Learning Sensor Data Classification System

Figure 7A:
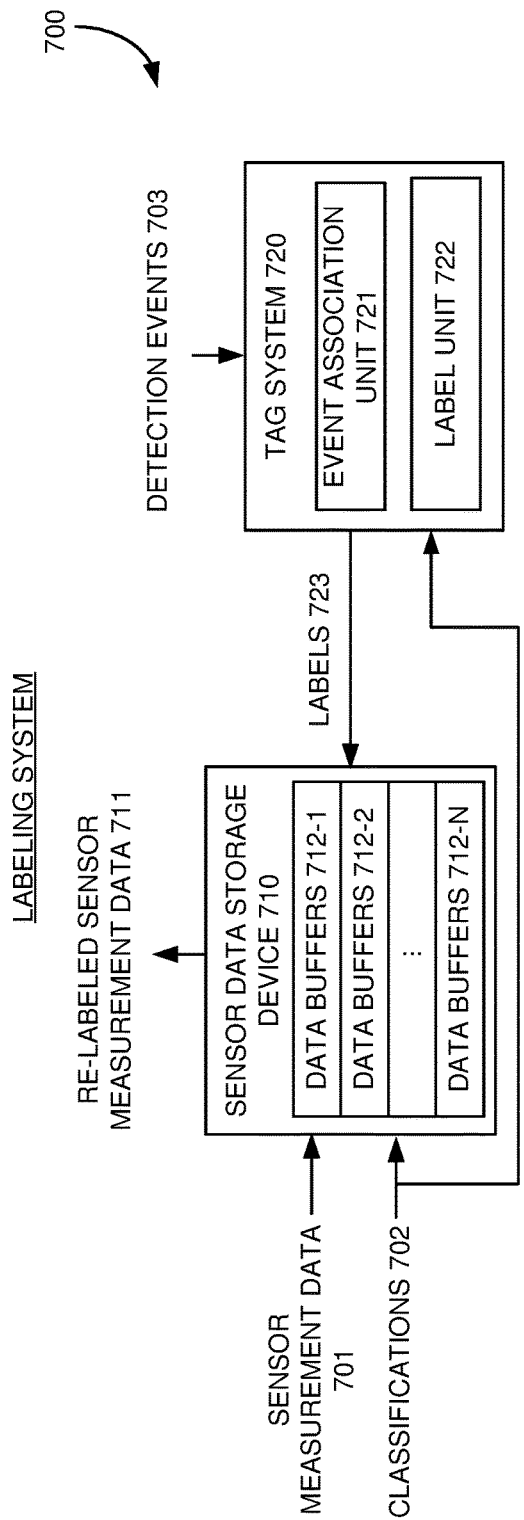
FIGS. 7A and 7B illustrate an example labeling system for sensor measurement data classified by a machine learning object classifier according to various examples.
Figure 7B:
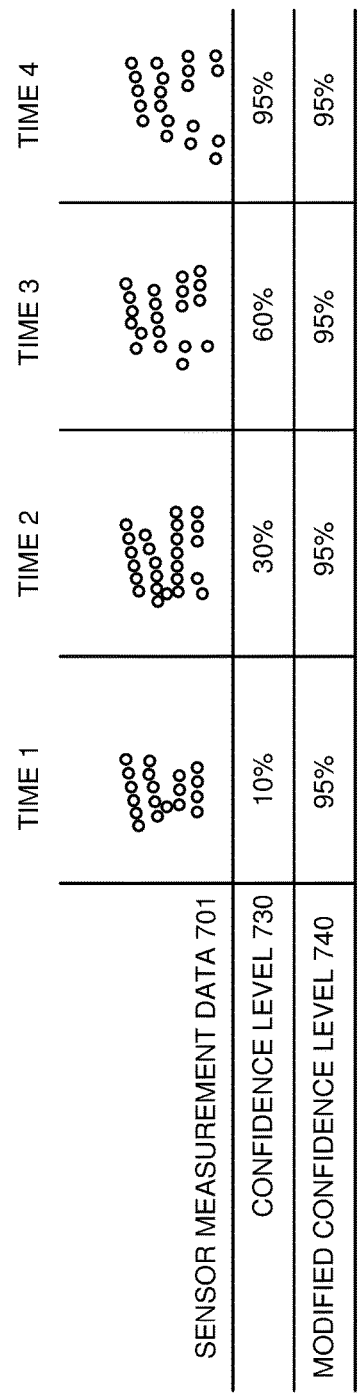

FIGS. 7A and 7B illustrate an example labeling system 700 for sensor measurement data 701 according to various examples. Referring to FIGS. 7A and 7B, the labeling system 700 can receive the sensor measurement data 701 and their corresponding classifications 702, for example, generated by a machine learning classifier in an autonomous driving system. In some embodiments, the classifications 702 can be included in the sensor measurement data 701, for example, the sensor measurement data 701 can be labeled with their corresponding classifications 702. The classifications 702 can identify a type of an object corresponding to the sensor measurement data 701 and confidence levels 730 associated with the classifications 702 of the sensor measurement data 701 by the machine learning classifier. For example, the classification 702 can correlate the sensor measurement data 701 to a pedestrian and indicate the confidence level 730 that the machine learning classifier had in making that correlation.

The labeling system 700 can correlate different sets of the sensor measurement data 701 to each other, for example, based on relationships between detection events 703 associated with the sets of the sensor measurement data 701. The labeling system 700 can analyze the classifications 702 of the correlated sets of the sensor measurement data 701 and selectively re-label the sensor measurement data 701 with different classifications or modified confidence levels 740, for example, generating re-labeled sensor measurement data 711. The labeling system 700 can output the re-labeled sensor measurement data 711, which, as will be discussed below in greater detail, can be utilized to build or modify one or more classification graphs and retrain the machine learning classifier. In some embodiments, the labeling system 700 can be included in the machine learning classifier, or located externally from a classification system.

The labeling system 700 can include sensor data storage device 710 to store the sensor measurement data 701 and its corresponding classifications 702 over time. In some embodiments, the sensor data storage device 710 can include multiple data buffers 712-1 to 712-N, which can store the sensor measurement data 701 and its corresponding classifications 702. Each of the data buffers 712-1 to 712-N may store sensor measurement data 701 based on the classifications 702, for example, the sensor measurement data 701 corresponding to a common classification can be stored in a common data buffer.

The labeling system 700 can include a tag system 720 to analyze the classifications 702 associated with correlated sets of the sensor measurement data 701 and selectively re-label the sensor measurement data 701 based on the analysis. The tag system 720 can include an event association unit 721 to correlate different sets of the sensor measurement data 701 to each other, for example, based on relationships between the detection events 703 associated with the sets of the sensor measurement data 701. The different sets of the sensor measurement data 701 can be correlated when they correspond to measurements of a common object proximate to a vehicle, but at measured different times, measured with different sensor modalities, or the like. The different sets of the sensor measurement data 701 also can be correlated based, at least in part, on their spatial locations relative to each other, sensor update rates, types of sensor measurement data correlated to the detection events, a visibility map, or the like. In some embodiments, the tag system 720 can receive associations between the detection events 703 from the machine learning classifier.

The tag system 720 can include a label unit 722 to selectively generate one or more labels 723, which can be utilized to modify the classifications 702 in the sensor data storage device 710 and to generate the re-labeled sensor measurement data 711. The label unit 722 can compare confidence levels 730 in the classifications 702 of sets of the sensor measurement data 701 that were associated or correlated to each other by the event association unit 721. The label unit 722 may generate one or more labels 723 based on the comparison. For example, when first set of the sensor measurement data 701 has a confidence level greater than second set of the sensor measurement data 701 that is associated with the first set, the label unit 722 can re-label the confidence level of the second set of the sensor measurement data 701 based, at least in part, on the confidence level of the first set of the sensor measurement data 701. In some embodiments, the label unit 722 can detect when one or more of the confidence levels 730 in the classifications 702 exceeds a threshold confidence level, and generate labels 723 for any associated sets of the sensor measurement data 701 based, at least in part, on the confidence levels 730 that exceed threshold confidence level.

In the example shown in FIG. 7B, the sensor measurement data 701 can include four sets of LIDAR patterns, each capturing a common object at different times. Although FIG. 7B shows four sets of LIDAR patterns, in some embodiments, the patterns can be associated with measurement data from one or more different sensor modalities. At time 1, the machine learning classifier assigns a classification to a first set of the sensor measurement data 701, which has a confidence level 730 of 10%. At time 2, the machine learning classifier assigns a classification to a second set of the sensor measurement data 701, which has a confidence level 730 of 30%. At time 3, the machine learning classifier assigns a classification to a third set of the sensor measurement data 701, which has a confidence level 730 of 60%. At time 4, the machine learning classifier assigns a classification to a fourth set of the sensor measurement data 701, which has a confidence level 730 of 95%.

The tag system 720 can associate these four sets of the sensor measurement data 701 and, based on the classification of the fourth set of the sensor measurement data 701 as having a confidence level 730 of 95%, the tag system 720 can generate labels 723 for the first, second, and third sets of the sensor measurement data 701. In this example, the labels 723 can modify the confidence levels of the classifications 702 for the first, second, and third sets of the sensor measurement data 701 to be equal to the confidence level of the fourth set of the sensor measurement data 701. The modified confidence levels 740 can be included in the re-labeled sensor measurement data 711. In some embodiments, the labels 723 can modify the object classification, such as pedestrian, vehicle, cyclist, static object, or the like, of the classifications 702 for the first, second, and third sets of the sensor measurement data 701 to be equal to the object classification of the fourth set of the sensor measurement data 701.

Figure 8:
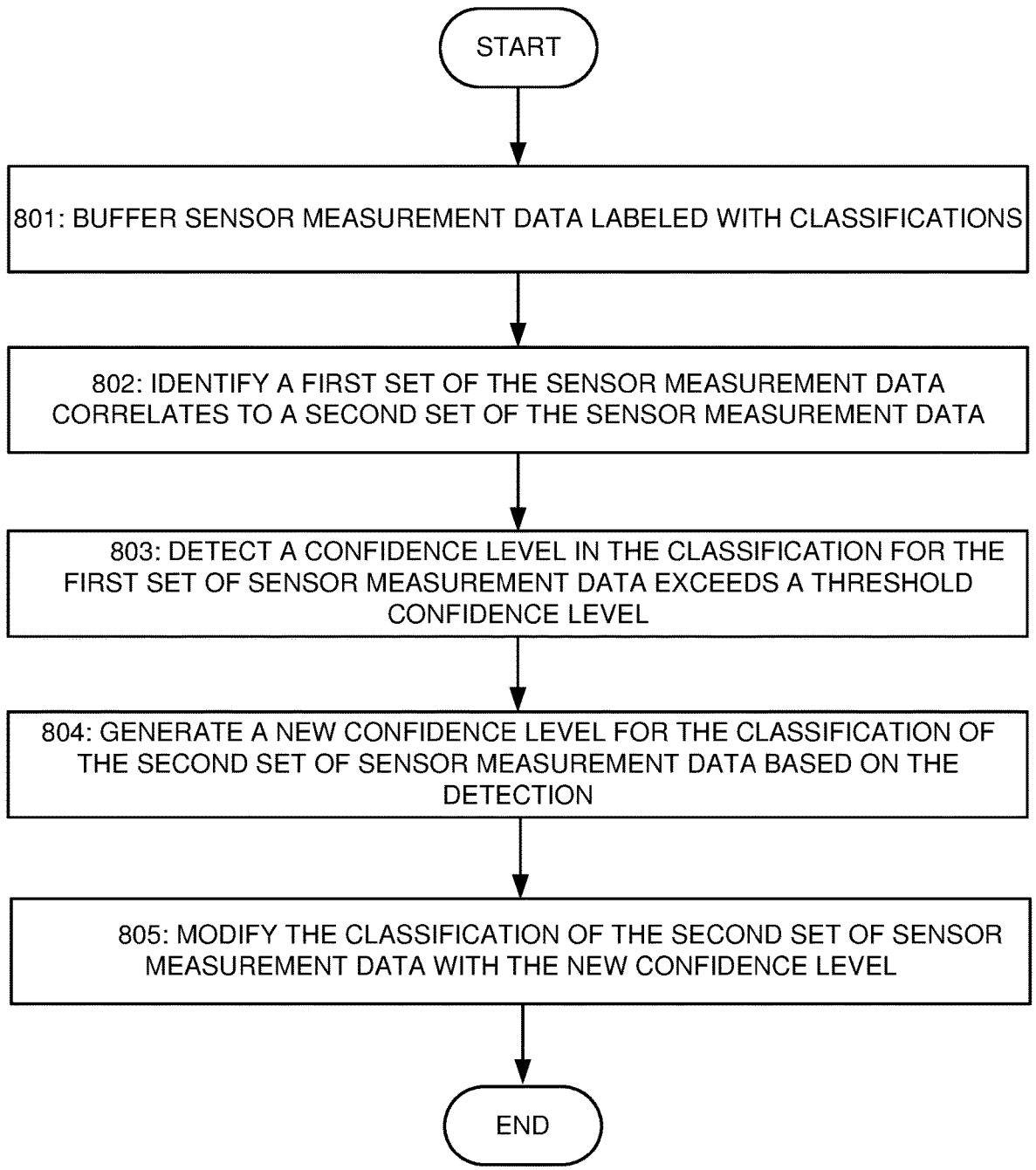
FIG. 8 illustrates an example table for labeling sensor measurement data according to various examples.

FIG. 8 illustrates an example table for labeling sensor measurement data according to various examples. Referring to FIG. 8, in a block 801, a labeling system, for example, implemented by a computing system, can buffer sensor measurement data labeled with classifications and, in a block 802, can identify a first set of the sensor measurement data correlates to a second set of the sensor measurement data. The labeling system can correlate the first and second sets of the sensor measurement data to each other based on relationships between detection events associated with the first and the second sets of the sensor measurement data. The labeling system can correlate the first and the second sets of the sensor measurement data based, at least in part, on their spatial locations relative to each other, sensor update rates, types of sensor measurement data correlated to the detection events, a visibility map, or the like. In some embodiments, the labeling system also can receive associations between the detection events from a machine learning classifier.

In a block 803, the labeling system can detect a confidence level in the classification for the first set of sensor measurement data exceeds a threshold confidence level. The threshold confidence level can correspond to a confidence level of the second set of sensor measurement data or a preset confidence level. In some embodiments, the threshold confidence level detection can be optional.

In a block 804, the labeling system can generate a new confidence level for the classification of the second set of sensor measurement data, for example, when the confidence level in the classification for the first set of sensor measurement data exceeds a threshold confidence level. In some embodiments, the labeling system can alter the classification of the second set of sensor measurement data to the classification of the first set of sensor measurement data, for example, when the confidence level in the classification for the first set of sensor measurement data exceeds a threshold confidence level.

In a block 805, the labeling system can modify the classification of the second set of sensor measurement data with the new confidence level. In some embodiments, the labeling system can write the new confidence level into the buffer storing the second set of measurement data, which can re-label the second set of the sensor measurement data with the classification having the new confidence level.

Figure 9:
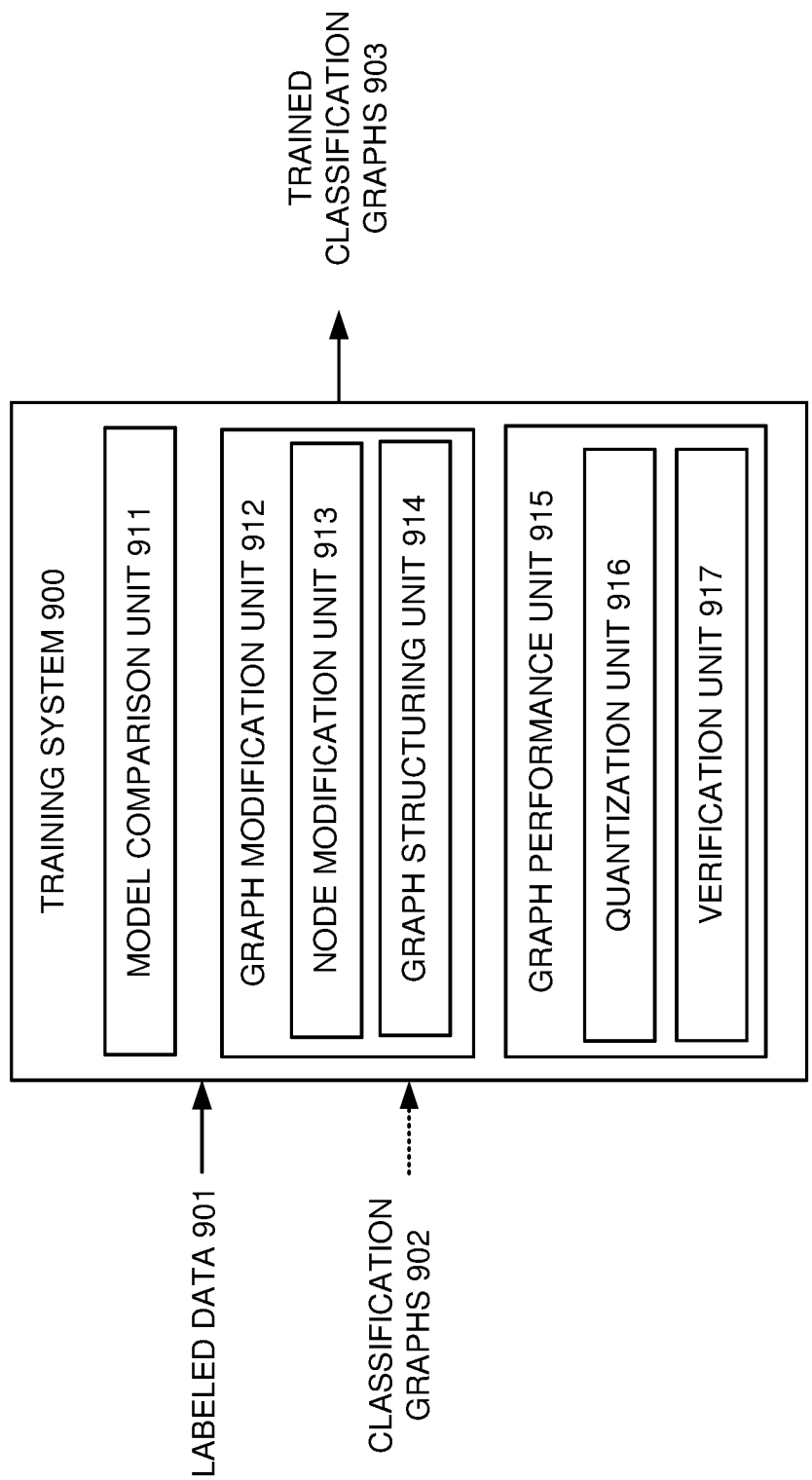
FIG. 9 illustrates an example object model training system according to various embodiments.

FIG. 9 illustrates an example training system 900 for one or more classification graphs according to various embodiments. Referring to FIG. 9, the training system 900 can receive labeled data 901 including sensor measurement data captured by one or more sensors, which has been labeled with a classification, for example, assigned by a machine learning classifier. The training system 900 also can receive one or more classification graphs 902, which the training system 900 can modify based, at least in part, on the labeled data 901. In some embodiments, the training system 900 can be located externally to an autonomous driving system or other computing system within a vehicle. For example, when a machine learning classifier generates the labeled data 901, the labeled data 901 can be output or uploaded to the training system 900 for use in training the classification graphs 902. The trained classification graphs 903 can be subsequently downloaded to the machine learning classifier. In other embodiments, the training system 900 can be implemented, at least in part, within the machine learning classifier or on-board computing system in the vehicle.

The training system 900 can include a model comparison unit 911 to compare the sensor measurement data in the labeled data 901 to object models described in the classification graphs 902. The model comparison unit 911 can select at least one node in the classification graphs 902 to compare with the sensor measurement data based, at least in part, on the classifications in the labeled data 901. For example, when a classification in the labeled data 901 corresponds to a pedestrian, the model comparison unit 911 can select one or more of the nodes describing a pedestrian object model. When the classification graphs 902 are structured with initial nodes and delta nodes, the model comparison unit 911 can initially select one or more of the initial nodes in the classification graphs 902, before making subsequent decisions on whether to select one or more of the delta nodes or another one of the initial nodes.

The model comparison unit 911 can allow the selected node to compute differences between the labeled data 901 and the object model described in the selected node. These differences can include an overlap between matchable data in the selected node and a two-dimensional or three-dimensional matchable representation of the sensor measurement data, a deformation distance for the matchable data in the selected node to overlap the sensor measurement data, or the like. The model comparison unit 911 can determine the differences or distance between the labeled data 901 and the object model described in the selected node by rotating either the labeled data 901 or the object data in the object model around at least one axis, such as an x-axis, a y-axis, or a z-axis. The model comparison unit 911 can determine the differences for segments or portions of the object model described in the selected node. For example, when the object model corresponds to a pedestrian, the model comparison unit 911 can divide the object model into features of a pedestrian, such as legs, torso, arms, head, hands, or the like, and determine differences between the sensor measurement data and those features.

The training system 900 can include a graph modification unit 912 to utilize the differences identified by the model comparison unit 911 to determine whether to alter the object model described in the selected node. In some embodiments, based on these differences, the graph modification unit 912 can decide to leave the object model in the selected node unaltered, to alter the object model in the selected node with the labeled data 901, to prompt the model comparison unit 911 to select another node in the classification graph to compare with the labeled data 901, to add a new node to the classification graph that describes a portion of the object model based on the labeled data 901, or the like. When the classification graph 902 does not include any nodes, for example, it is empty, the graph modification unit 912 can decide to add a new node to the classification graph that describes a portion of the object model based on the labeled data 901.

In some embodiments, the graph modification unit 912 can apply weightings to the differences between the sensor measurement data and the object model described in the selected node prior to making the decision. For example, the selected node can include a weighted matchable data map, which can identify a relative significance of overlap or lack thereof in different portions or segments of the object model. The graph modification unit 912 can utilize the weighted matchable data map to determine a magnitude of the differences in overlap between the labeled data 901 to the object model described in the selected node. The selected node also can include deformation weights, which can identify a relative significance of deformations or lack thereof that the selected node performed during the comparison process. The graph modification unit 912 can utilize the deformation weights to determine a magnitude of the deformations made to the object model described in the selected node during the comparison.

The graph modification unit 912 can include a node modification unit 913 to modify the object model described in the selected node based on the decision by the graph modification unit 912. For example, the node modification unit 913 can alter or add matchable data to the selected node, which corresponds to the sensor measurement data in the labeled data 901. The node modification unit 913 may alter the weighted matchable data map and/or the deformation weights in the object model of the selected node based on the differences between the sensor measurement data and the object model described in the selected node.

The graph modification unit 912 can include a graph structuring unit 914 to modify a structure of the classification graph 902 based on the decision by the graph modification unit 912. The structure of the classification graph 902 can include a number of nodes in the classification graph 902, a node depth of the classification graph 902, an organization of the nodes in the classification graph 902, types of nodes in the classification graph 902, a resolution of the matchable data in the nodes, or the like. The graph structuring unit 914 can determine the structure that the classification graph 902 based on a variety of factors, for example, which hardware will implement a machine learning classifier that utilizes the trained classification graph 903, power consumption goals of the autonomous driving system, performance requirements of the machine learning classifier utilizing the trained classification graph 903, or the like.

When the graph modification unit 912 decides a new node that has an object model corresponding to the labeled data 901, the graph structuring unit 914 can determine where in the classification graph 902 the new node should be located, the type of object model description should be included in the new node, such as whether the new node should be an initial node or a delta node, which other nodes to link to the new node, or the like. In some embodiments, a link between nodes in the classification graph 902 can implicitly identify a relationship between the nodes, such as a deformation difference, a size difference, a localization difference, or the like. By checking the object classes in labeled data 901 during training and by using the delta nodes, the classification graph 902 can be trained to classify objects and to stop classifying other objects at different levels of detail.

The graph structuring unit 914 also can inform the graph modification unit 912 that the decision to add a new node would not be supported by the structure of the classification graph 902 based on available hardware resources, power consumption goals, performance requirements, or the like. The graph modification unit 912, based on this information, can decide to prompt modification an existing node with the labeled data 901 or otherwise re-structure the classification graph 902, such as by combining existing nodes, linking nodes differently in the classification graph 902, rescheduling node traversal in the classification graph 902, or the like.

In some embodiments, the graph structuring unit 914 can add a new node or new links between nodes regardless of the resulting structure of the classification graph 902, for example, generating an overgrown classification graph 902, which can be subsequently paired down based on available hardware resources, power consumption goals, performance requirements, or the like.

The training system 900 can include a graph performance unit 915 to reduce a resolution of the matchable data in the nodes of the classification graph 902. For example, the graph performance unit 915 can include a quantization unit 916 to quantize the matchable data in the classification graph 902, which can reduce a size, expressed as a number of bits, of the matchable data. By reducing the resolution of the matchable data, the machine learning classifier implementing the trained classification graph 903 can have increased throughput and smaller classifier size—with reduced memory utilization—in node computation, but a reduced confidence level associated with classifications.

The graph performance unit 915 can include a verification unit 917 to balance the trade-offs of the quantization of the matchable data in the nodes, for example, the trade-offs between node computation throughput and classification confidence level. The verification unit 917, in some embodiments, can interact with the quantization unit 916 to identify a quantization that improves throughput of the node computation without dropping confidence level of classifications by those nodes below a threshold level.

In some embodiments, the graph performance unit 915 can generate the trained classification graph 903 by growing the classification graph 902 based on the labeled data 901 and then selecting a subset of the nodes in the grown classification graph. For example, the graph performance unit 915 can identify redundant nodes or links between nodes to remove from the grown classification graph. The graph performance unit 915 can select the nodes in the trained classification graph 903 through a graph benchmark process, which can check the classification key performance indicators (KPIs), such as classification precision, classification latency, test set completeness, classifier size, target platform parameters, or the like.

The training system 900 may determine to stop training the classification graph 902 based on the labeled data 901 due to training set completeness. The training system 900 can detect training set completeness when the training of the classification graph 902 is based on the labeled data 901. In some embodiments, the training system 900 can detect training set completeness when the training has been adding little new information to the trained classification graph 903. In other embodiments, the training system 900 can detect training set completeness when the nodes in the trained classification graph 903 have closed transitions between their object states, for example, when each pedestrian node links to one or more pedestrian nodes corresponding to previous movement states and one or more pedestrian nodes corresponding to subsequent movement states. In another example, when each vehicle node links to one or more vehicle nodes corresponding to previous direction states and one or more pedestrian nodes corresponding to subsequent direction states.

Figure 10:
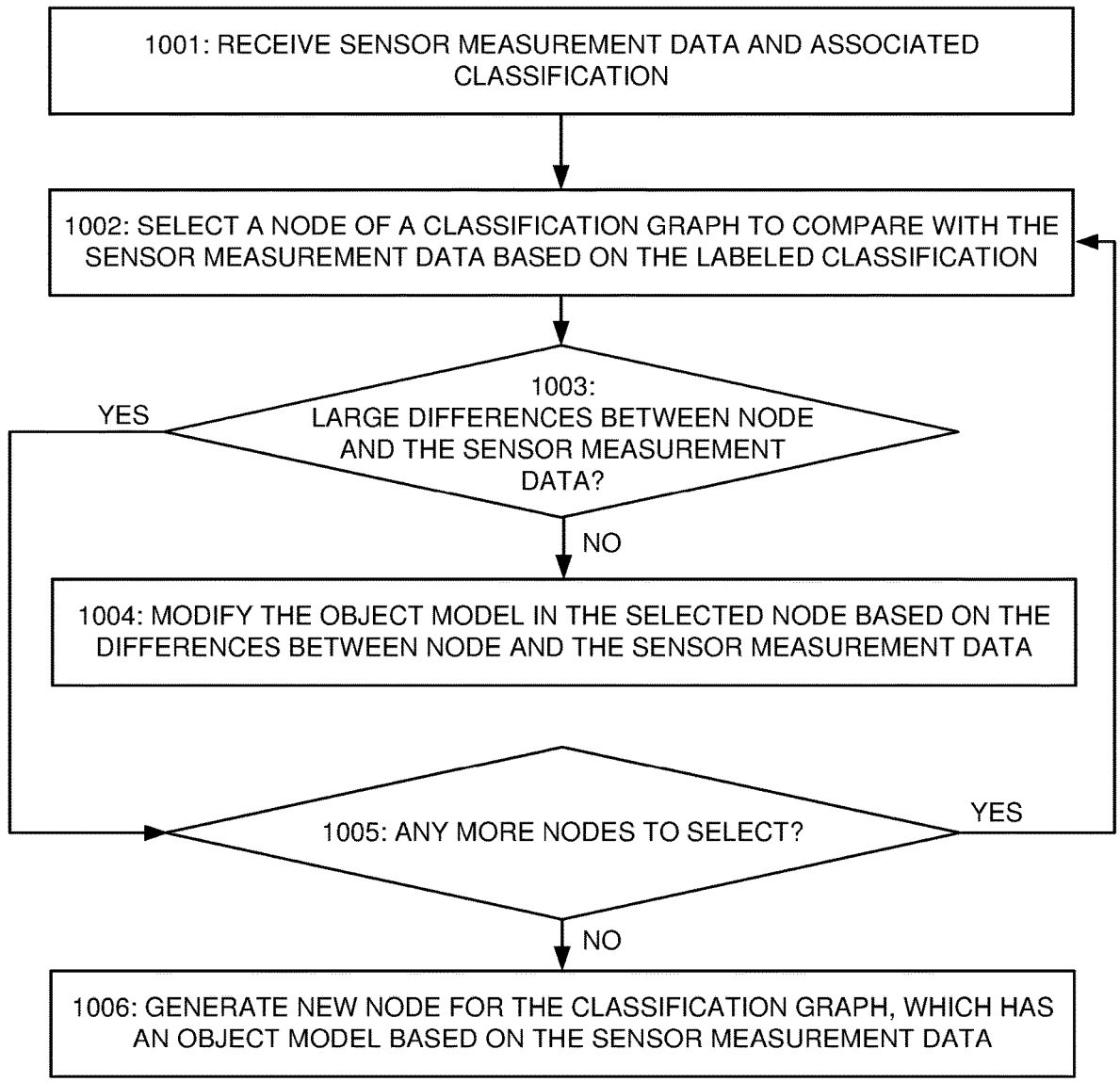
FIG. 10 illustrates an example flowchart for training an object model with labeled sensor measurement data according to various examples.

FIG. 10 illustrates an example flowchart for training an object model with labeled sensor measurement data according to various examples. Referring to FIG. 10, in a block 1001, a computing system implementing an object model training system can receive sensor measurement data labeled with a classification. In some embodiments, the sensor measurement data can be labeled with the classification by a labeling system in an autonomous driving system.

In a block 1002, the computing system can select a node of a classification graph to compare with the sensor measurement data based on the labeled classification. For example, when the label classification corresponds to a vehicle, the computing system can select a node describing a vehicle object model. When the classification graph is structured with initial nodes and delta nodes, the computing system can initially select an initial node in the classification graph, before making subsequent decisions on whether to select a delta node or another initial node. The computing system can allow the selected node to compute differences between the sensor measurement data and the object model described in the selected node. These differences can include an overlap between matchable data in the selected node and a two-dimensional or three-dimensional matchable representation of the sensor measurement data, a deformation distance for the matchable data in the selected node to overlap the sensor measurement data, or the like.

In a block 1003, the computing system can determine whether there are large differences between the matchable data in the node and the sensor measurement data. For example, the computing system can compare a shape difference between the matchable data and the sensor measurement data to a threshold level of difference to determine whether the differences were considered large. The computing system also can compare an overlap between the matchable data and the sensor measurement data to a threshold level of difference to determine whether the differences were considered large. The computing system also can compare a deformation distance that the matchable data underwent during the node computation to a threshold distance level to determine whether the differences were considered large. The computing system may perform these comparisons on the whole of the matchable data or one different segments or portions of the matchable data. The computing system may utilize any of these comparisons individually or in some combination to determine whether the differences between the matchable data in the node and the sensor measurement data were large.

When, in the block 1003, the computing system did not consider the differences between the matchable data in the node and the sensor measurement data to be large, in a block 1004, the computing system can modify the object model in the selected node based on the differences between node and the sensor measurement data. For example, the computing system can alter or add matchable data to the selected node, which corresponds to the sensor measurement data. The computing system also may alter a weighted matchable data map and/or deformation weights in the object model of the selected node based on the differences between the sensor measurement data and the object model described in the selected node.

When, in the block 1003, the computing system did consider the differences between the matchable data in the node and the sensor measurement data to be large, in a block 1005, the computing system can determine whether there are any more nodes to select. In some embodiments, since the computing system can attempt to find a closest match between the sensor measurement data and the object model in a node of the classification graph, the determination of whether any other nodes can be selected may be based on whether the selectable nodes would provide a closer match to than the selected node.

In a block 1006, the computing system can generate new node for the classification graph, which has an object model based on the sensor measurement data. The computing system can determine where in the classification graph the new node should be located, the type of object model description that should be included in the new node, such as whether the new node should be an initial node or a delta node, which other nodes to link to the new node, or the like. In some embodiments, a link between nodes in the classification graph can implicitly identify a relationship between the nodes, such as a deformation difference, a size difference, a localization difference, or the like.

Illustrative Operating Environment

The execution of various driving automation processes according to embodiments may be implemented using computer-executable software instructions executed by one or more programmable computing devices. Because these embodiments may be implemented using software instructions, the components and operation of a programmable computer system on which various embodiments of the invention may be employed will be described below.

Figure 11:
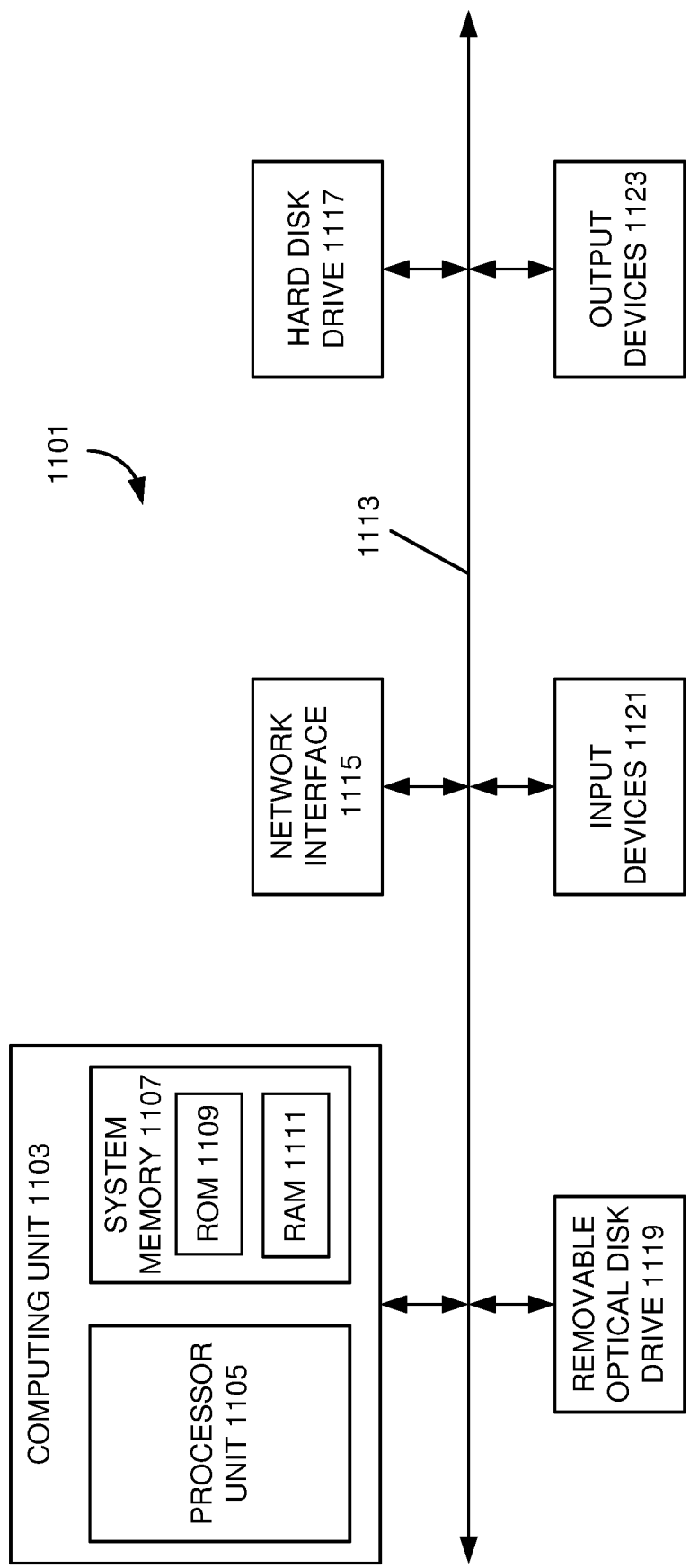
FIGS. 11 and 12 illustrate an example of a computer system of the type that may be used to implement various embodiments of the invention.
Figure 12:
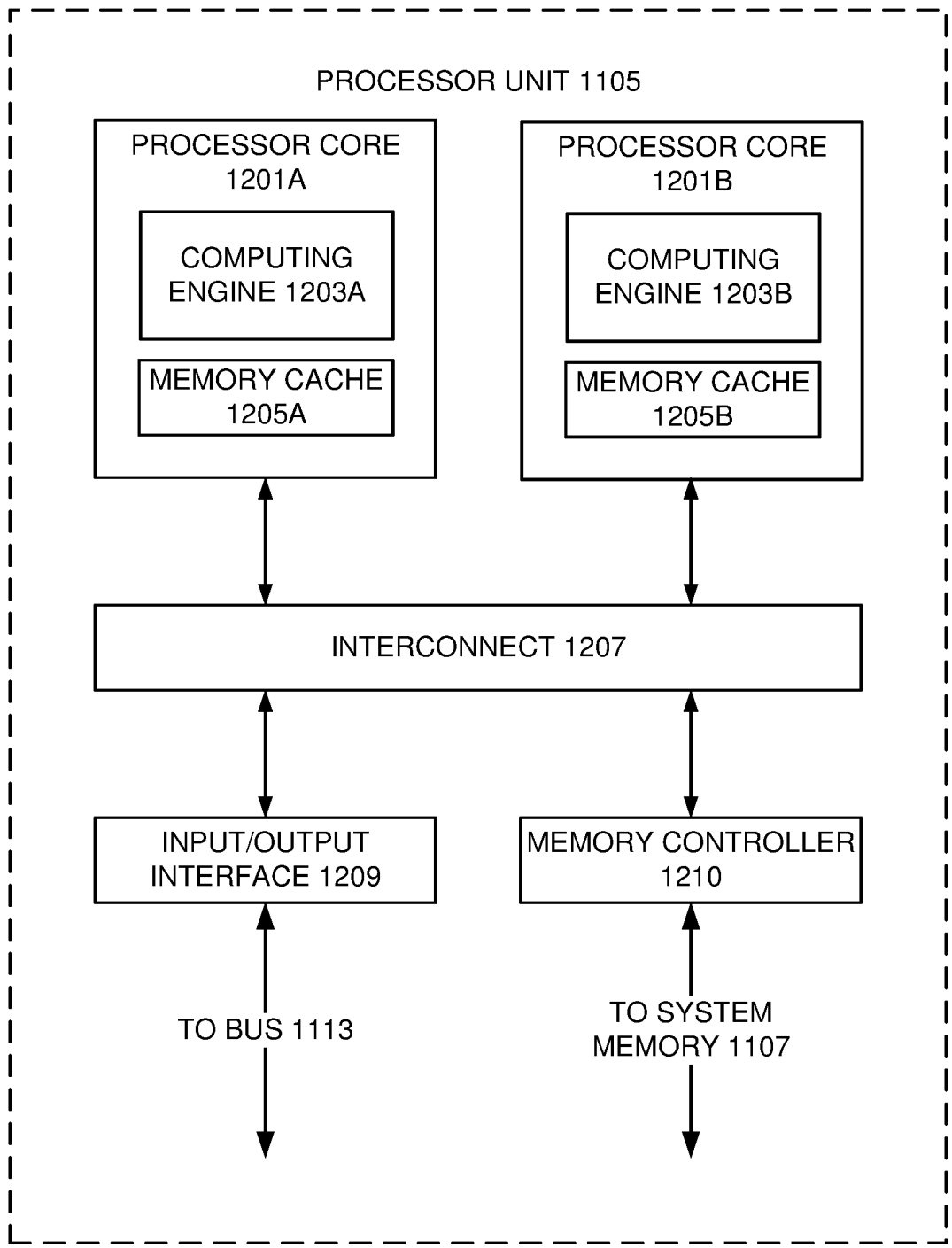

FIGS. 11 and 12 illustrate an example of a computer system of the type that may be used to implement various embodiments of the invention. Referring to FIG. 11, various examples may be implemented through the execution of software instructions by a computing device 1101, such as a programmable computer. Accordingly, FIG. 11 shows an illustrative example of a computing device 1101. As seen in FIG. 11, the computing device 1101 includes a computing unit 1103 with a processing unit 1105 and a system memory 1107. The processing unit 1105 may be any type of programmable electronic device for executing software instructions, but will conventionally be a microprocessor. The system memory 1107 may include both a read-only memory (ROM) 1109 and a random access memory (RAM) 1111. As will be appreciated by those of ordinary skill in the art, both the read-only memory (ROM) 1109 and the random access memory (RAM) 1111 may store software instructions for execution by the processing unit 1105.

The processing unit 1105 and the system memory 1107 are connected, either directly or indirectly, through a bus 1113 or alternate communication structure, to one or more peripheral devices 1117-1123. For example, the processing unit 1105 or the system memory 1107 may be directly or indirectly connected to one or more additional memory storage devices, such as a hard disk drive 1117, which can be magnetic and/or removable, a removable optical disk drive 1119, and/or a flash memory card. The processing unit 1105 and the system memory 1107 also may be directly or indirectly connected to one or more input devices 1121 and one or more output devices 1123. The input devices 1121 may include, for example, a keyboard, a pointing device (such as a mouse, touchpad, stylus, trackball, or joystick), a scanner, a camera, and a microphone. The output devices 1123 may include, for example, a monitor display, a printer and speakers. With various examples of the computing device 1101, one or more of the peripheral devices 1117-1123 may be internally housed with the computing unit 1103. Alternately, one or more of the peripheral devices 1117-1123 may be external to the housing for the computing unit 1103 and connected to the bus 1113 through, for example, a Universal Serial Bus (USB) connection.

With some implementations, the computing unit 1103 may be directly or indirectly connected to a network interface 1115 for communicating with other devices making up a network. The network interface 1115 can translate data and control signals from the computing unit 1103 into network messages according to one or more communication protocols, such as the transmission control protocol (TCP) and the Internet protocol (IP). Also, the network interface 1115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 1101 is illustrated as an example only, and it not intended to be limiting. Various embodiments may be implemented using one or more computing devices that include the components of the computing device 1101 illustrated in FIG. 11, which include only a subset of the components illustrated in FIG. 11, or which include an alternate combination of components, including components that are not shown in FIG. 11. For example, various embodiments may be implemented using a multi-processor computer, a plurality of single and/or multiprocessor computers arranged into a network, or some combination of both.

With some implementations, the processor unit 1105 can have more than one processor core. Accordingly, FIG. 12 illustrates an example of a multi-core processor unit 1105 that may be employed with various embodiments. As seen in this figure, the processor unit 1105 includes a plurality of processor cores 1201A and 1201B. Each processor core 1201A and 1201B includes a computing engine 1203A and 1203B, respectively, and a memory cache 1205A and 1205B, respectively. As known to those of ordinary skill in the art, a computing engine 1203A and 1203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 1203A and 1203B may then use its corresponding memory cache 1205A and 1205B, respectively, to quickly store and retrieve data and/or instructions for execution.

Each processor core 1201A and 1201B is connected to an interconnect 1207. The particular construction of the interconnect 1207 may vary depending upon the architecture of the processor unit 1105. With some processor cores 1201A and 1201B, such as the Cell microprocessor created by Sony Corporation, Toshiba Corporation and IBM Corporation, the interconnect 1207 may be implemented as an interconnect bus. With other processor units 1201A and 1201B, however, such as the Opteron™ and Athlon™ dual-core processors available from Advanced Micro Devices of Sunnyvale, Calif., the interconnect 1207 may be implemented as a system request interface device. In any case, the processor cores 1201A and 1201B communicate through the interconnect 1207 with an input/output interface 1209 and a memory controller 1210. The input/output interface 1209 provides a communication interface between the processor unit 1105 and the bus 1113. Similarly, the memory controller 1210 controls the exchange of information between the processor unit 1105 and the system memory 1107. With some implementations, the processor unit 1105 may include additional components, such as a high-level cache memory accessible shared by the processor cores 1201A and 1201B. It also should be appreciated that the description of the computer network illustrated in FIG. 11 and FIG. 12 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   selecting, by a computing system, a node in a classification graph based, at least in part, on a classification labeled to sensor measurement data collected by sensors mounted in a vehicle;
   comparing, by the computing system, the sensor measurement data to matchable data in the selected node to identify differences between the sensor measurement data and the matchable data in the selected node; and
   modifying, by the computing system, the classification graph by generating a new node for the classification graph, wherein the new node includes matchable data based, at least in part, on the differences between the sensor measurement data and the matchable data in the selected node, wherein a control system is configured to control vehicle operations based, at least in part, on object classifications identified by the modified classification graph.

2. The method of claim 1, wherein modifying the classification graph further comprising altering the matchable data in the selected node based, at least in part, on the differences between the sensor measurement data and the matchable data in the selected node.

3. The method of claim 1, wherein generating the new node includes linking the new node to the selected node in the classification graph, wherein the link between the selected node and the new node allows for traversal between the selected node and the new node in the classification graph during classification operations.

4. The method of claim 1, further comprising:
   identifying a first set of the sensor measurement data is correlated to a second set of the sensor measurement data; and
   re-labeling the first set of the sensor measurement data with a classification associated with the second set of the sensor measurement data.

5. The method of claim 4, wherein re-labeling the first set of the sensor measurement data with the classification associated with the second set of the sensor measurement data based on a confidence level of the classification associated with the second set of the sensor measurement data.

6. The method of claim 1, wherein the matchable data includes an object model having at least one of an object pose, an object orientation, a transitional state, an object deformation, or a textural feature.

7. An apparatus comprising at least one memory device storing instructions configured to cause one or more processing devices to perform operations comprising:
   selecting a node in a classification graph based, at least in part, on a classification labeled to sensor measurement data collected by sensors mounted in a vehicle;
   identifying a first set of the sensor measurement data is correlated to a second set of the sensor measurement data;
   re-labeling the first set of the sensor measurement data with a classification associated with the second set of the sensor measurement data;
   comparing the sensor measurement data to matchable data in the selected node to identify differences between the sensor measurement data and the matchable data in the selected node; and
   modifying the classification graph based, at least in part, on the differences between the sensor measurement data and the matchable data in the selected node, wherein a control system is configured to control vehicle operations based, at least in part, on object classifications identified by the modified classification graph.

8. The apparatus of claim 7, wherein modifying the classification graph further comprising altering the matchable data in the selected node based, at least in part, on the differences between the sensor measurement data and the matchable data in the selected node.

9. The apparatus of claim 7, wherein modifying the classification graph further comprising generating a new node for the classification graph, wherein the new node includes matchable data based, at least in part, on the differences between the sensor measurement data and the matchable data in the selected node.

10. The apparatus of claim 9, wherein generating the new node includes linking the new node to the selected node in the classification graph, wherein the link between the selected node and the new node allows for traversal between the selected node and the new node in the classification graph during classification operations.

11. The apparatus of claim 7, wherein re-labeling the first set of the sensor measurement data with the classification associated with the second set of the sensor measurement data based on a confidence level of the classification associated with the second set of the sensor measurement data.

12. The apparatus of claim 7, wherein the matchable data includes an object model having at least one of an object pose, an object orientation, a transitional state, an object deformation, or a textural feature.

13. A system comprising:
a memory device configured to store machine-readable instructions; and
a computing system including one or more processing devices, in response to executing the machine-readable instructions, configured to:
select a node in a classification graph based, at least in part, on a classification labeled to sensor measurement data collected by sensors mounted in a vehicle;
compare the sensor measurement data to matchable data in the selected node to identify differences between the sensor measurement data and the matchable data in the selected node; and
modify the classification graph by generating a new node for the classification graph, wherein the new node includes matchable data based, at least in part, on the differences between the sensor measurement data and the matchable data in the selected node, wherein a control system is configured to control vehicle operations based, at least in part, on object classifications identified by the modified classification graph.

14. The system of claim 13, wherein the one or more processing devices, in response to executing the machine-readable instructions, are configured to modify the classification graph by altering the matchable data in the selected node based, at least in part, on the differences between the sensor measurement data and the matchable data in the selected node.

15. The system of claim 13, wherein the one or more processing devices, in response to executing the machine-readable instructions, are configured to generate the new node by linking the new node to the selected node in the classification graph, wherein the link between the selected node and the new node allows for traversal between the selected node and the new node in the classification graph during classification operations.

16. The system of claim 13, wherein the one or more processing devices, in response to executing the machine-readable instructions, are configured to:
identify a first set of the sensor measurement data is correlated to a second set of the sensor measurement data; and
re-label the first set of the sensor measurement data with a classification associated with the second set of the sensor measurement data.

17. The system of claim 16, wherein the one or more processing devices, in response to executing the machine-readable instructions, are configured to re-label the first set of the sensor measurement data with the classification associated with the second set of the sensor measurement data based on a confidence level of the classification associated with the second set of the sensor measurement data.

* * * * *